(12) United States Patent
Papadopoulos

(10) Patent No.: US 10,965,387 B2
(45) Date of Patent: Mar. 30, 2021

(54) TRANSCEIVER CALIBRATION FOR LARGE-SCALE AND MASSIVE MIMO DEPLOYMENTS

(71) Applicant: NTT DOCOMO, INC., Tokyo (JP)

(72) Inventor: Haralabos Papadopoulos, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 615 days.

(21) Appl. No.: 16/090,819

(22) PCT Filed: Apr. 29, 2016

(86) PCT No.: PCT/US2016/030214
§ 371 (c)(1),
(2) Date: Oct. 3, 2018

(87) PCT Pub. No.: WO2016/176626
PCT Pub. Date: Nov. 3, 2016

(65) Prior Publication Data
US 2020/0328829 A1    Oct. 15, 2020

Related U.S. Application Data

(60) Provisional application No. 62/155,380, filed on Apr. 30, 2015.

(51) Int. Cl.
*H04B 17/14* (2015.01)
*H04B 17/12* (2015.01)
(Continued)

(52) U.S. Cl.
CPC ........... *H04B 17/14* (2015.01); *H04B 7/0413* (2013.01); *H04B 17/12* (2015.01); *H04B 17/21* (2015.01)

(58) Field of Classification Search
CPC ..................................................... H04B 17/14
See application file for complete search history.

(56) References Cited

U.S. PATENT DOCUMENTS

2004/0085243 A1* 5/2004 Kuokkanen ............. G01S 19/17
342/457
2010/0099326 A1* 4/2010 De La Torre .......... A63H 33/22
446/232

(Continued)

OTHER PUBLICATIONS

Papadopoulos et al Avalanche: Fast RF calibration of massive arrays, 2014 IEEE Global Conference on Signal and Information Processing (GlobalSIP) (Year: 2014).*

(Continued)

*Primary Examiner* — Hsinchun Liao
(74) *Attorney, Agent, or Firm* — Womble Bond Dickinson (US) LLP

(57) ABSTRACT

A method and apparatus is disclosed herein for wireless transceiver calibration. In one embodiment, the method for relative calibration of multiple transceiver units for their use for joint transmission from groups of transceiver units to at least one other wireless entity, wherein each transceiver unit includes an antenna element, comprises: exchanging pilots using multiple signaling resource slots, using at least two non-overlapping groups of transceiver units; and performing calibration of transceiver units in the first and second groups of transceiver units, including choosing relative calibration parameters to control calibration and using a metric to assess calibration, where the metric is based on at least one combination of calibration parameters and the observations of each transceiver group in at least two groups of transceiver units based the simultaneous pilot broadcast and subsequent reception between transceiver units in pairs of groups of transceiver units.

25 Claims, 8 Drawing Sheets

Partition M antennas into T groups:
$I_1, I_2, I_3, \ldots, I_T$ — 201

For each t, each antenna in the t-th antenna group $I_t$ transmits a pilot on each TX resource t, and collects observations over each TX resource $\tau \neq 1$ — 202

(51) Int. Cl.
*H04B 17/21* (2015.01)
*H04B 7/0413* (2017.01)

(56) References Cited

OTHER PUBLICATIONS

Japanese Office Action for Application No. 2018-191923, dated Jul. 2, 2019, 2 pages.
Japanese Office Action for Application No. 2018-191923, dated Jun. 27, 2019, 2 pages.

* cited by examiner

| Antenna Group 301 ↓ \ Slot Index 302 → | 1 | 2 | 3 | ... | τ | ... | T |
|---|---|---|---|---|---|---|---|
| $I_1$ | TX | $\widetilde{y}_1(2)$ | $\widetilde{y}_1(3)$ | ... | $\widetilde{y}_1(\tau)$ | ... | $\widetilde{y}_1(T)$ |
| $I_2$ | $\widetilde{y}_2(1)$ | TX | $\widetilde{y}_2(3)$ | ... | $\widetilde{y}_2(\tau)$ | ... | $\widetilde{y}_2(T)$ |
| $I_3$ | $\widetilde{y}_3(1)$ | $\widetilde{y}_3(2)$ | TX | ... | $\widetilde{y}_3(\tau)$ | ... | $\widetilde{y}_3(T)$ |
| ⋮ | ⋮ | ⋮ | ⋮ | ⋮ | ⋮ | ⋮ | ⋮ |
| $I_\tau$ | $\widetilde{y}_\tau(1)$ | $\widetilde{y}_\tau(2)$ | $\widetilde{y}_\tau(3)$ | ... | TX | ... | $\widetilde{y}_\tau(T)$ |
| ⋮ | ⋮ | ⋮ | ⋮ | ⋮ | ⋮ | ⋮ | ⋮ |
| $I_\tau$ | $\widetilde{y}_T(1)$ | $\widetilde{y}_T(2)$ | $\widetilde{y}_T(3)$ | ... | $\widetilde{y}_T(\tau)$ | ... | TX |
| | ↓ | ↓ | ↓ | ... | ↓ | ... | ↓ |
| ΔR = | | $R_{1,2}$ | $R_{1,3}+R_{2,3}$ | ... | $\sum_{\tau=1}^{\tau-1} R_{\tau,T}$ | ... | $\sum_{\tau=1}^{T-1} R_{\tau,T}$ |
| | | ↓ | ↓ | ... | ↓ | ... | ↓ |
| R= | | ΔR | R + ΔR | | R + ΔR | | R + ΔR |

$d = \text{argmin } d^H R d$
$d: |d|^2 = 1$

FIG. 3

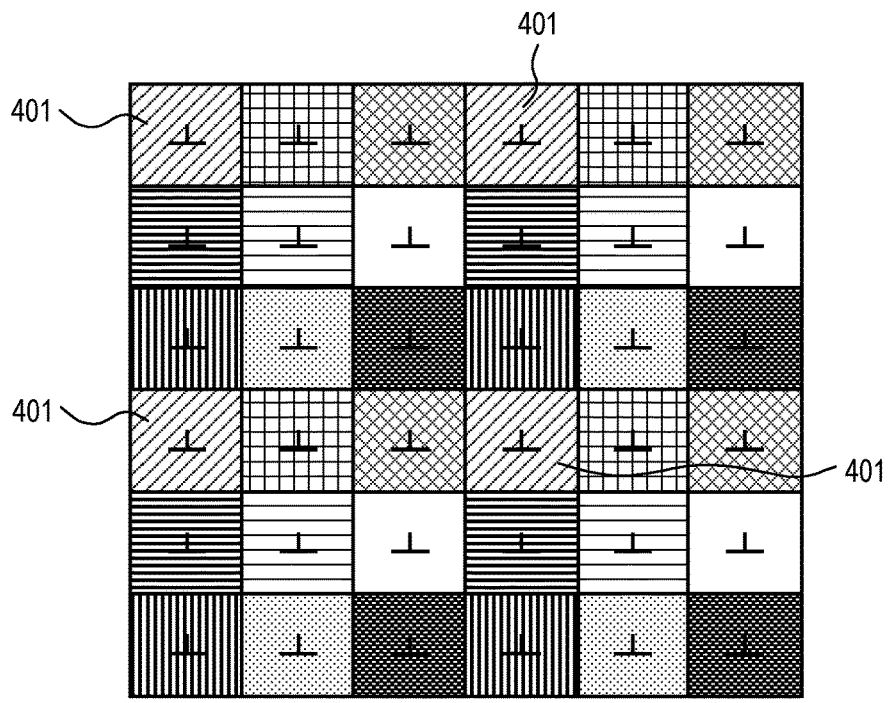

FIG. 4

|  | Slot 1 | Slot 2 | Slot 3 | Slot 4 | Slot 5 | Slot 6 | Slot 7 | Slot 8 | Slot 9 |
|---|---|---|---|---|---|---|---|---|---|
| 501 Green | TX | RX | RX | RX | RX | RX | RX | RX | RX |
| 502 Blue | RX | TX | RX | RX | RX | RX | RX | RX | RX |
| 503 Yellow | RX | RX | TX | RX | RX | RX | RX | RX | RX |
| 504 Magenta | RX | RX | RX | TX | RX | RX | RX | RX | RX |
| 505 Red | RX | RX | RX | RX | TX | RX | RX | RX | RX |
| 506 Purple | RX | RX | RX | RX | RX | TX | RX | RX | RX |
| 507 Grey | RX | RX | RX | RX | RX | RX | TX | RX | RX |
| 508 Cyan | RX | RX | RX | RX | RX | RX | RX | TX | RX |
| 509 Orange | RX | RX | RX | RX | RX | RX | RX | RX | TX |

| | Symbol 1 | Symbol 2 | ... | Symbol t | ... | Symbol T |
|---|---|---|---|---|---|---|
| Tone 1 | All k: (1,1,k) | All k: (1,2,k) | ... | All k: (1,t,k) | ... | All k: (1,T,k) |
| Tone 2 | All k: (2,1,k) | All k: (2,2,k) | ... | All k: (2,t,k) | ... | All k: (2,T,k) |
| ⋮ | ⋮ | ⋮ | ⋮ | ⋮ | | ⋮ |
| Tone n | All k: (n,1,k) | All k: (n,2,k) | ... | All k: (n,t,k) | ... | All k: (n,T,k) |
| ⋮ | ⋮ | ⋮ | ⋮ | ⋮ | | ⋮ |
| Tone N | All m, k: (m,1,k) | All m, k: (m,2,k) | ... | All m, k: (m,t,k) | ... | All m, k: (m,T,k) |

TRANSCEIVER CALIBRATION FOR LARGE-SCALE AND MASSIVE MIMO DEPLOYMENTS

CROSS-REFERENCE TO RELATED APPLICATIONS

This patent application is a U.S. National Phase application under 35 U.S.C. § 371 of International Application No. PCT/US2016/030214, filed Apr. 29, 2016, entitled "TRANSCIEVER CALIBRATION FOR LARGE-SCALE AND MASSIVE MIMO DEPLOYMENTS", which claims priority to and incorporates by reference the corresponding U.S. provisional patent application no. 62/155,380, entitled, "TRANSCIEVER CALIBRATION FOR LARGE-SCALE AND MASSIVE MIMO DEPLOYMENTS", filed on Apr. 30, 2015.

FIELD OF THE INVENTION

Embodiments of the present invention relate to the field of wireless communication; more particularly, embodiments of the present invention relate to calibrating transceivers.

BACKGROUND OF THE INVENTION

RF impairment calibration has been thought to be the major challenge in enabling reciprocity-based MU-MIMO. The first demonstration of reciprocity-based MIMO involving a base station with a large number of array elements was provided by Argos (Shepard et al., "Argos: Practical Many-Antenna Base Stations", Mobicom 2012, pp. 53-64). Argos relies on an internal self-calibration method, i.e., a calibration method that does not require over the air feedback to enable spatial multiplexing with reciprocity-based MU-MIMO transmission. In Yilmaz et al., "Method and Apparatus for Internal Relative Transceiver Calibration for Reciprocity-based MU-MIMO Deployments", International Patent Application No. PCT/US2013/032299, an improved family of calibration methods is presented. These schemes can work with the same calibration signaling as in Argos, but can provide vastly superior calibration performance, especially for settings involving calibration of antenna arrays where the antennas are not collocated. Furthermore, signaling protocols exist that can be used for hierarchical calibration of already calibrated antenna arrays. Others perform efficient calibration in cellular, which can enable coherent MIMO transmission over multiple closely located cell-sites.

Signaling protocols locally rely on the basic signaling efficiency of Argos, where an array of M elements can be calibrated, provided (at least) M independent time-frequency resource elements are used for pilot transmissions (and at least two of these transmissions happen at different times). Some pilot protocols and calibration schemes allow calibration of large arrays with much lower signaling overheads but rely on performing calibration in multiple stages. The calibrated part of the array increases in each stage. In particular, at any given stage, the part of the array that has already been calibrated serves as a reference array and is used to calibrate several other antenna elements. These schemes are referred to as Avalanche calibration, hereinafter "Avalanche", due to the fact that as the size of the reference array grows with more stages, more and more antennas can be calibrated together with successive stages in a sort of Avalanche effect.

SUMMARY OF THE INVENTION

A method and apparatus is disclosed herein for wireless transceiver calibration. In one embodiment, the method for relative calibration of multiple transceiver units for their use for joint transmission from groups of transceiver units to at least one other wireless entity, wherein each transceiver unit includes an antenna element, comprises: exchanging pilots using multiple signaling resource slots, using at least two non-overlapping groups of transceiver units, including a first group of transceiver units simultaneously broadcasting a first pilot in a first slot and each transceiver in a group of transceiver units that includes transceiver units in a second group of transceiver units receiving a first observation, and the second group of transceiver units simultaneously broadcasting a second pilot in a second slot and each transceiver in a group that includes the transceiver units in the first group of transceiver units receiving a second observation; and performing calibration of transceiver units in the first and second groups of transceiver units, including choosing relative calibration parameters to control calibration and using a metric to assess calibration, where the metric is based on at least one combination of calibration parameters and the observations of each transceiver group in at least two groups of transceiver units based the simultaneous pilot broadcast and subsequent reception between transceiver units in pairs of groups of transceiver units.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates antenna-group pilot exchanges and calibration in accordance with an embodiment of the invention.

FIG. 4 illustrates group partitioning for a patch of antennas based on a lattice.

DETAILED DESCRIPTION OF THE PRESENT INVENTION

Figure 1:
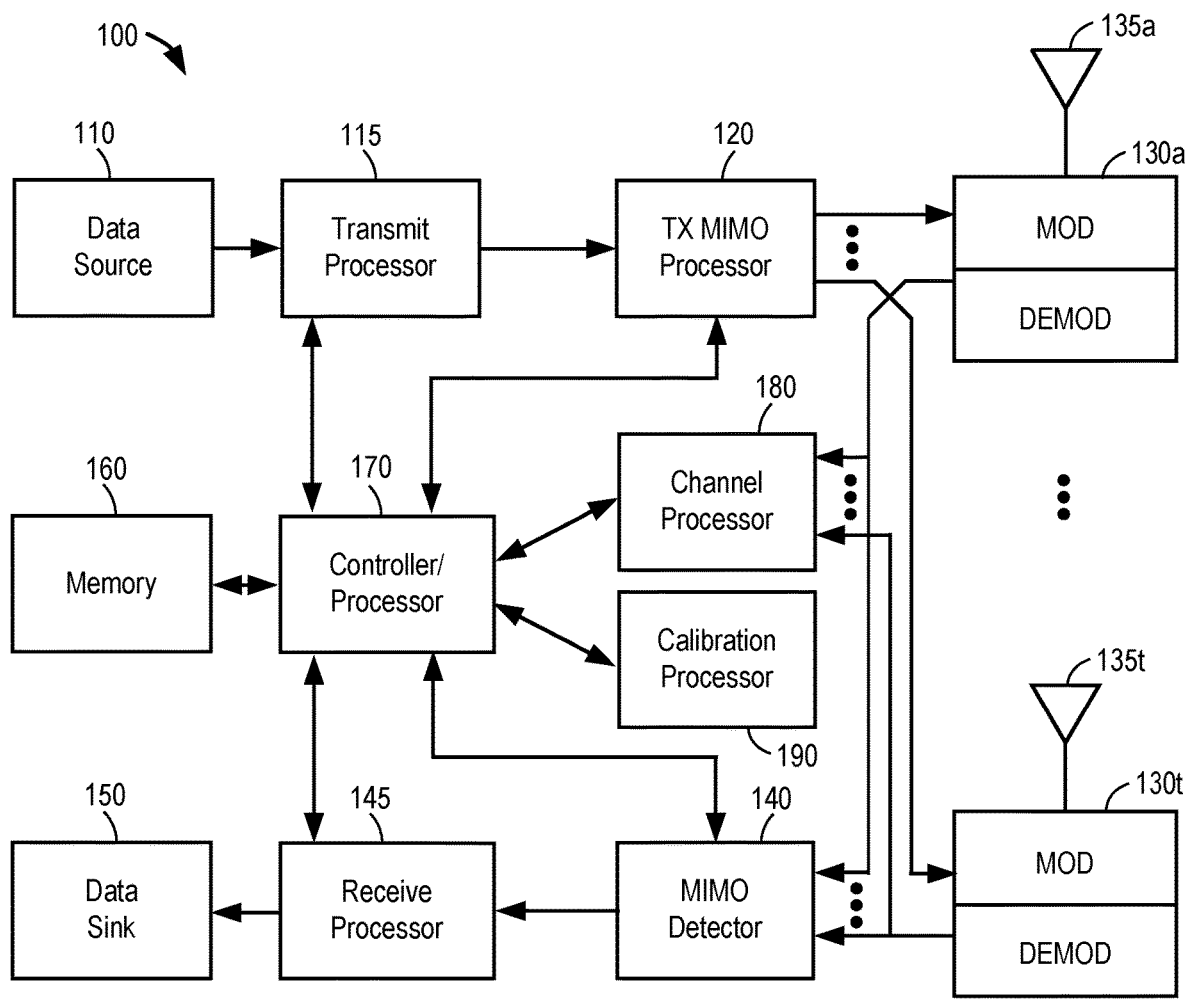
FIG. 1 is a block diagram of one embodiment of a base station including a calibration processor unit.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the invention include a class of calibration schemes for calibrating large arrays with low overheads. In one embodiment, the largest possible number of array elements that can be calibrated by given number of calibration pilot slots is the same for both Avalanche and the schemes disclosed herein. However, the disclosed schemes allow much more options in pilot signaling, some of which result is substantially better performance than Avalanche. As a result, for a given number of pilot slots, the disclosed techniques allow calibrating reliably much larger arrays than Avalanche. Furthermore, the disclosed schemes do not need to operate in stages (although in principle they can). The disclosed mechanisms allow enormous flexibility in that they can accomplish calibration with a much broader set of signaling options than Avalanche. Some of these signaling options can allow low-overhead calibration of distributed (i.e., non-collocated) arrays.

Limitations of the Argos Calibration System

The Argos calibration method has its limitations. First note that the relative calibration of each base-station antenna (with respect to the reference antenna) is formed as the ratio of two observations, and, in particular, by dividing $[\vec{X}_{calib}^H y_{S\rightarrow 1}]_{m-1}$ with $[y_{S\rightarrow 1}]_{m-1}$. The noise in the dividing term $[y_{S\rightarrow 1}]_{m-1}$ can cause a large estimation error in the calibration estimate. Their solution was to carefully place the reference antenna with respect to the rest of the base-station antennas in a position so that its horizontal distance to the other antennas is approximately identical. Such a need for careful placement of the reference antenna with respect to the rest of the transmitting antennas is a significant limiting factor in deployments relying on the Argos calibration methods, as it significantly limits their efficacy in downlink MU-MIMO deployments from sets of non-collocated antennas.

Robust Relative Calibration

Relative calibration methods can be used for providing calibration that robustly enables high-performance reciprocity-based downlink MU-MIMO schemes from collocated as well non-collocated antenna arrays.

Extensions of the Argos approach involve the same topology and the same number of calibration training slots, i.e. D slots per base-station antenna (with D≥1). The extension is that each antenna, including the calibration antenna 1, first broadcasts independently its training symbols. This requires the same signaling dimensions as Argos but also requires the matrix $\vec{X}_{calib}$ to be diagonal, i.e., when each of the antennas in the set S transmits, the remaining set of antennas in S are not transmitting and thereby they can receive. After each antenna has broadcasted its training symbol(s), all the measurements are collected of the form $$y_{ij} = \vec{r}_i h_{ij} \vec{t}_j + w_{ij}$$

corresponding to the training symbol from antenna j to antenna i, for each i≠j 0≤ij≤M. This is in contrast to Argos which relies only on the set of observations $y_{i1}$ and $y_{1i}$, for all i. In the preceding equation, $w_{ij}$ is an i.i.d. complex Gaussian noise sample, with appropriate variance (including the effect of the training length D, which may be a design parameter to trade-off efficiency for noise margin, as explained before). Assuming perfect physical channel reciprocity, i.e., $h_{ij}=h_{ji}$ and grouping the above measurements in pairs, $$\begin{bmatrix} y_{ij} \\ y_{ji} \end{bmatrix} = \begin{bmatrix} \vec{r}_i \vec{t}_j \\ \vec{r}_j \vec{t}_i \end{bmatrix} h_{ij} + \begin{bmatrix} w_{ij} \\ w_{ji} \end{bmatrix} \quad (1)$$

$$= \begin{bmatrix} c_i \\ c_j \end{bmatrix} \beta_{ij} + \begin{bmatrix} w_{ij} \\ w_{ji} \end{bmatrix}$$

where $\beta_{ij} = \vec{t}_i \vec{t}_j h_{ij}$ are complex coefficients associated to the unordered pair of antennas i,j.

Since, in the absence of noise, $y_{ij} c_j = y_{ji} c_i = c_i c_j \beta_{ij}$, a natural cost function can be formed $$J(c_1, c_2, \ldots, c_M) = \sum_{\substack{j>i \\ (i,j) \in F}} |y_{ij} c_j - y_{ji} c_i|^2 \quad (2)$$

and the relative calibration coefficients can be selected so as to minimize this metric. The set F defines the set of (i,j) pairs of ordered measurements ($y_{ij}$, $y_{ji}$) used for determining the calibration coefficients. In order to avoid the trivial all-zero solution, without loss of generality, $|c_1|=1$.

Calibration coefficients can be found as the solution of the optimization problem:

$$\text{minimize } J(c_1, c_2, \ldots, c_M) = \sum_{\substack{j>i \\ (i,j) \in F}} |y_{ij} c_j - y_{ji} c_i|^2$$

$$\text{subjects to } \sum_{k=1}^{M} |c_k|^2 = 1$$

Avalanche: Fast Multi-Stage Relative Calibration

Another class of methods for relative transceiver calibration provides the calibration quality necessary for enabling high-performance reciprocity-based downlink Massive MIMO with much lower calibration training overhead than other methods described above. The calibration methods are a family of multi-stage calibration methods referred to herein as Avalanche schemes. In the Avalanche scheme, a part of the array is calibrated at each stage and is used as a reference array for calibration in the following stage. Using a single simultaneous pilot transmission from multiple antennas allows calibrating them with respect to the already calibrated part of the array. The name avalanche comes from the fact that the successively calibrated groups of antennas have a growing size, and that calibration somehow "propagates" through these larger and larger groups in a sort of avalanche effect.

Avalanche relies on calibrating multiple elements simultaneously with respect to a pre-calibrated "reference" array, with a single additional pilot transmission. In particular, assume that a single pilot slot is used per stage, and after L stages (slots), an array of M>1 elements has been already calibrated. Then Avalanche can calibrate up to K antennas with respect to the reference array (thereby growing the reference array to a size M+K for the next stage), as long as K is not larger than the maximum of L and M.

The maximum array size that can be calibrated by any calibration method with T calibration slots is $M_{max}(T)$. Avalanche in principle can calibrate the maximum size array with T calibration slots. However, in practice, the presence of thermal noise in the calibration pilot observations affects the quality of calibration, and, due to the multistage nature of Avalanche calibration, calibration errors on the reference array up to a given calibration stage, propagate in the following stages. As a result, in practice, Avalanche can reliably calibrate much shorter arrays than $M_{max}(T)$. With just two calibration stages, for instance, reliable calibration should be expected if $M<M_{max}(T)/2$.

The calibration techniques disclosed herein improve upon the calibration performance of Avalanche schemes. In particular, these schemes allow reliable calibration with M as large as 95% of $M_{max}(T)$. Describing it in a different way, let $T_{min}$ denote the minimum number of calibration slots required to calibrate an array of size M. That is, $T_{min}$ is the smallest value of T for which $M<M_{max}(T)$. To calibrate reliably an array of size M (for large M), the inventive schemes disclosed herein require at most $T_{min}+1$ slots, i.e., they are within one slot of the theoretically optimal efficiency. Although important variants of the disclosed schemes can work in stages, the disclosed schemes allow calibration of the whole array in "one shot," i.e., a single stage.

The disclosed techniques calibrate arrays more reliably than Avalanche at least in part because the disclosed techniques allow calibration with a much broader class of calibration signaling protocols. To illustrate this, consider calibrating an array of size $M_{max}(T)$, and let $K_t$ denote the number of antennas transmitting pilots in slot t. Assume also (without loss of generality) that the $K_t$'s are in non-decreasing order. To calibrate an array of size $M_{max}(T)$, Avalanche requires that $K_1=1$ and $K_t=t-1$ for $t\geq 2$. However the disclosed schemes allow calibration of the array with a much broader class of signaling protocols. In particular, the disclosed schemes allow calibration with balanced protocols, for which $K_t \approx M/T$, for all t. As it turns out, the resulting calibration quality is far superior with balanced protocols than with the Avalanche protocols.

Overview

A class of very high efficiency, readily scalable methods for relative transceiver calibration is presented herein. These relative calibration methods can be used to provide the calibration quality necessary for enabling high-performance reciprocity-based downlink MU-MIMO schemes, and can do so with much lower calibration training overhead than the state-of-the-art alternatives such as, for example, Argos and robust calibration techniques, and with significantly higher calibration quality than the techniques known as Avalanche. The proposed calibration methods can enable reliable joint calibration of Massive MIMO in small cells, with collocated or non-collocated antenna elements and with manageable overheads. A combination of new reference-signaling methods for calibration and new techniques for performing calibration are also disclosed, enabling resource-efficient and reliable and robust calibration. Embodiments are also presented that allow robust and reliable and resource-efficient calibration (including hierarchical calibration) for network Massive MIMO, and/or MU-MIMO based on remote radio heads.

Embodiments of the invention have one or more of the following advantages with respect to the Argos approach, the robust calibration techniques discussed above, and the fast calibration techniques referred to as Avalanche:

1) In the basic scenario involving calibrating a large array of collocated elements, the calibration techniques set forth herein allow reliably calibrating arrays of much larger size (possibly orders of magnitude larger) without increasing the training overhead than the existing techniques;

2) In the basic scenario involving calibrating a large array of collocated elements, and for the same training overheads as Avalanche, the disclosed techniques can yield superior calibration performance with respect to Avalanche. Subject to a given calibration training overhead, the disclosed techniques enable sharper MIMO beams than state of the art techniques, including Avalanche.

3) The techniques presented herein can also be used to allow low-overhead reliable calibration of remote-radio head (RRH) systems for MU-MIMO, and of cellular deployments for network MIMO transmission.

4) The techniques disclosed herein can also be used to enable more general MU-MIMO deployment schemes in which user terminals are simultaneously served by different (overlapping) sets of antennas in a field of antenna elements. Embodiments of the present invention perform such calibration with (possibly much) lower overheads than other techniques or their combination with Avalanche.

5) Embodiments of the invention also include reference-signaling methods for calibration of both collocated and non-collocated antennas arrays. Many of these calibration signaling options work only with the disclosed methods, i.e., they cannot enable RF calibration for reciprocity-based MU-MIMO if used in conjunction with Avalanche, its combination with Argos, or any other state of the art technique.

Embodiments of the invention allow low-overhead reliable calibration for reciprocity-based MU-MIMO from antenna arrays comprised of collocated or non-collocated antenna elements. Subject to a given training overhead, the disclosed methods calibrate reliably larger arrays than Avalanche. Given an array of a given size, the disclosed methods require lower overhead than Avalanche to reliably calibrate the array. As an example, consider calibrating an array using 20 slots for calibration signaling. Both the disclosed methods and Avalanche can in principle calibrate an array of up to 191 elements. However, while a two-stage Avalanche calibration approach calibrates reliably an array of about 90 antenna elements, the disclosed methods establish reliable calibration of as many as 180 antenna elements. The disclosed methods also allow calibrating sets of non-collocated arrays with both lower overhead and higher precision than the combination of Avalanche and hierarchical calibration techniques.

Embodiments of this invention include calibration methods that enable calibrating large (collocated or non-collocated) antenna arrays with higher efficiency than Avalanche calibration. Specifically methods disclosed herein allow reliable calibration of an array of a given size with lower signaling overheads than Avalanche. Alternatively, for the same signaling overheads, they can calibrate reliably much larger arrays than is possible with Avalanche calibration. Furthermore, embodiments of the invention enable reliable, fast self-calibration methods for downlink (DL) MU-MIMO deployments from non-collocated antennas. These DL MU-MIMO options include the use of network MIMO techniques over cellular deployments, MU-MIMO based on remote radio heads (RRH), as well as more general "MU-MIMO over a field of antennas" schemes, in which multiple-users are served simultaneously by overlapping sets of non-collocated antennas.

FIG. 1 shows a block diagram of one embodiment of a base-station. Referring to FIG. 1, Base-station 100 includes standard modules for MIMO wireless transmission.

A transmit processor 115 receives data for one or more UEs from a data source 110, processes the data for each UE and provides data symbols to all UEs. Processor 115 also receives and processes control information from a controller/processor 170 and provides control symbols. Processor 170 also generates reference symbols for one or more reference signals. In one embodiment transmit (TX) MIMO processor 120 performs precoding on the data symbols, the control symbols, and/or the reference symbols for each UE as well as for reference signals for antennas collocated at the same base-station 100 or to other wireless entities such as other base-stations, RRH's, etc.

Processor 120 provides parallel output symbols streams to modulators, MODS (130a through 130t). Each modulator 130 further processes (e.g., convert to analog, amplify, filter, and upconvert) the output sample stream to obtain a downlink signal. The downlink signals from modulators 130a through 130t are transmitted via antennas 135a through 135t, respectively.

At base-station 100, the uplink signals from various UE's or by other antennas, collocated at the same base station 100 or located at different base-stations or other wireless entities are received by antennas 135a through 135t, demodulated by demodulators (DEMODs 130a-130t). The demodulated signals are detected by MIMO detector 140 and further processed by receive processor 145 to obtain decoded data and control information sent by UEs and other wireless entities. Receive processor 145 receives detected signals from MIMO detector 140 and provides decoded data to data sink 150 and control information to controller/processor 170. The demodulated signals output by DEMODs 130a through 130t are also provided to channel processor 180 where uplink channel may be estimated and provided to controller/processor 170.

Base-station 100 also includes a calibration processor unit 190. Calibration processor unit 190 is responsible for estimating (and possibly compensating for) the impairments introduced by RF-to-baseband conversion hardware (e.g., gain control, filters, mixers, A/D, etc.) coupled with each antenna element 135a through 135t when base-station 100 processes uplink received signals from these elements, as well as the impairments introduced by the baseband-to-RF conversion hardware (e.g., amplifiers filters, mixers, A/D, etc.) coupled with each antenna element 135a through 135t when base-station 100 generates the signals that are to be transmitted by base-station antenna elements 135a through 135t. In one embodiment, viewing the combination of 130a with antenna element 135a as a single (non-calibrated) transceiver unit, and viewing all such combinations of modulator/demodulator 130a through 130t with their respective antenna elements 135a through 135t as individual transceiver units, calibration processor 190 performs processes for relative calibration of a subset of these transceiver units that may be used to enable reciprocity based MU-MIMO from a subset of these transceiver units. In one embodiment, Calibration Processor 190 exchanges control information with controller/processor unit 170. In one embodiment, Calibration processor 190 calculates calibration values, which may be used at controller/processor 170 together with UL channel estimation to construct one or more precoding vectors for one or more UEs and provide them to TX MIMO processor 120 for precoding. In one embodiment, calibration processor 190 receives additional information from other base stations, indicative of signals received and/or transmitted by other base stations, to assist in relative calibration of transceiver units connected to separate base stations. Embodiments of this invention are enabled by calibration processor unit 190, and involve both the signaling and data collection aspects of calibration as well as the relative calibration methods set forth herein, which are based on the collected data, and, possibly additional parameters, including past relative calibration values for arbitrary subsets of the transmit antenna nodes at this and possibly other base stations.

Novel families of relative calibration protocols are disclosed, which enable reliable calibration of massive arrays with low overheads. In one embodiment, calibration occurs over blocks of T×N time-frequency (TF) resource elements in the OFDM plane. In particular, in one embodiment, T is within the coherence time of these channels and also within the coherence time of the RF impairment quantities that need to be calibrated.

Similarly, denoting the coherence bandwidth of these channels is F, and depending on the value of N, F may be larger or smaller than N. Typically, however, the coherence bandwidth of the RF impairment quantities that need to be calibrated exceeds N.

Indeed, in practice, the calibration bandwidth is large, in that the amplitude is effectively constant over the transmission band, while the (complex-phasor) phase varies linearly over the band. Indeed, one or at most a few complex scalars corresponding to the relative calibration between any antenna pair on one or a few OFDM tones suffice to determine the rest of the coefficients across the OFDM band. Hence a single or, maybe, few calibration parameters are needed per antenna to calibrate an antenna array for coherent transmission over the whole OFDM band. This can be exploited for efficient and fast calibration. We consider the case that only a single coefficient per antenna pairs suffices. Extensions can be devised in a straightforward manner.

Embodiments of the invention include methods for calibrating larger-size networks within a T×N block of time-frequency slots, for any T≥2, any N≥1 and any F value. The description that follows initially discusses the case of N=1 (involving a block of T TF slots over a single OFDM tone), and discloses methods allowing to calibrate a number of nodes that grows quadratically with T. Then the general (N, T) case is disclosed with F≥N and protocols for which the number of calibrated nodes grows quadratically with both T and N are presented, as is the case with the Avalanche schemes. Finally, the case F≤N is considered, and protocols are disclosed for which the number of calibrated nodes grows quadratically with T and linearly with the product FN, again as with the Avalanche schemes. However, in all these cases, the disclosed methods allow significantly more freedom and flexibility in the signaling they can employ for calibration with respect to Avalanche. As a result, they allow more symmetric signaling options and these options allow much higher calibration quality. These options can be exploited to provide hierarchical calibration for distributed Massive MIMO, which is far superior to the one provided by the combination of Avalanche and the hierarchical calibration of the prior art, both in terms of signaling efficiency and calibration quality.

Signaling Protocols and Calibration Methods for the N=1 Case

In the case of N=1 there are T available slots for the base station antennas to enable calibration of the array of size M. In one embodiment, the calibration schemes are used in conjunction with T-slot calibration signaling, in which each antenna transmits only a single pilot, i.e., each antenna transmits a pilot for a single t in $\{1, 2, \ldots, T\}$. The calibration schemes can also be used (appropriately modified) in settings where antennas may transmit more than one calibration pilot. A family of calibration signaling schemes is described below.

Initially, a set $I=\{1, 2, \ldots, M\}$ of M base station antennas is partitioned into T groups. Letting $K_t$ denote the size of the t-th group (with $M=\sum_{t=1}^{T}K_t$) without loss of generality, let the t-th set comprise the following nodes $$I_t=\{j\in IM_{t-1}<j\leq M_t\} \quad \text{(Equation 2a)}$$

where $$M_t = \begin{cases} \sum_{n=1}^{t} K_n & \text{if } 1 \leq t \leq T \\ 0 & \text{if } t = 0 \end{cases} \quad \text{(Equation 2b)}$$

$\bar{I}_t$ denotes the compliment of $I_t$.

In (calibration) slot t, for each $t\in\{1, 2, \ldots, T\}$, the nodes in the t-th set $I_t$ simultaneously transmit pilots. Let $p_i$ denote the (non-zero and real-valued, without loss of generality) scalar pilot transmitted by node i in the set $I_t$ in slot t.

In slot t, for each $t\in\{1, 2, \ldots, T\}$, each node in $\bar{I}_t$ collects an observation. The observation that node $j\in\bar{I}_\tau$ obtains at time t, for $\tau\neq t$, is given by $$y_j(t) = \sum_{i\in I_i} \overleftarrow{r}_j p_i \overleftarrow{t}_i h_{ij} + z_j(t) \quad \text{(Equation 3)}$$

where $\overleftarrow{x}_j$, $\overleftarrow{h}_{ij}$, $\overleftarrow{y}_{ij}$, and $\overleftarrow{z}_{ij}$ denote the transmitted signal from node j, the uplink (UL) channel between the two antennas, the observation and noise at the receiver of base-station antenna, respectively. The scalar (complex) coefficient $\overleftarrow{r}_i$ contains the amplitude and phase shifts introduced by RF-to-baseband conversion hardware (gain control, filters, mixers, A/D, etc.) at the receiver of base-station antenna i. Similarly, the scalar (complex) coefficient $\overleftarrow{t}_j$ contains the amplitude and phase shifts introduced by the baseband-to-RF conversion hardware (amplifiers filters, mixers, A/D, etc.) at the transmitter generating the signal to be transmitted by user terminal j.

Figure 2:
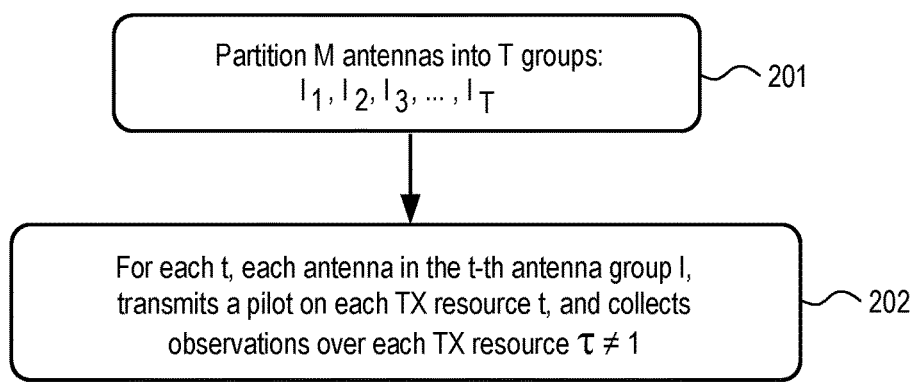
FIG. 2 is a flow diagram of a process that includes group partitioning and pilot exchanges.

This group partitioning for calibration pilot signaling and observation collection is illustrated FIG. 2.

Assuming the time difference between any pair of calibration slots is within (i.e., no larger than) the coherence time of the base station antenna to base station antenna channels, all base station antenna to base station antenna channels are reciprocal, i.e., $h_{ij}=h_{ji}$, for all i, $j\in I$ with $i\neq j$.

As a prelude to presenting the relative calibration method of interest for this family of signaling protocols, Equation 3 is re-expressed, i.e., the observation that node $j\in\bar{I}_\tau$ obtains at time t, for $\tau\neq t$, as follows:

$$y_j(t) = \sum_{i\in\bar{I}_t} p_i d_i u_{ij} + z_j(t) \quad \text{(Equation 4a)}$$

where $$u_{ij}=u_{ji}=\overleftarrow{r}_i \overleftarrow{r}_j h_{ij}=\overleftarrow{r}_i \overleftarrow{r}_j h_{ji} \quad \text{(Equation 4b)}$$

and $$d_i \vec{t}_i / \overleftarrow{r}_i \quad \text{(Equation 4c)}$$

Scaling both sides of (Equation 4a) by $p_j d_j$, and summing over all $j\in\bar{I}_\tau$ the following is obtained $$\sum_{j\in\bar{I}_\tau} y_t(t) p_j d_j = \sum_{i\in I_t}\sum_{j\in\bar{I}_\tau} p_i p_j d_i d_j u_{ij} + \sum_{j\in\bar{I}_\tau} z_j(t) p_j d_j \quad \text{(Equation 5a)}$$

Similarly, based on the observations collected by all nodes $i\in I_t$ time $\tau$, the calibration processor has $$\sum_{i\in I_t} y_i(\tau) p_i d_i = \sum_{i\in I_t}\sum_{j\in\bar{I}_\tau} p_i p_j d_i d_j u_{ij} + \sum_{j\in\bar{I}_t} z_i(\tau) p_i d_i \quad \text{(Equation 5b)}$$

Consequently, a squared-error function of the form $$J_{cal}(d_1, d_2, \cdots, d_M) = \sum_{(t,\tau):1\leq t\leq \tau\leq T} \varepsilon(t, \tau) \quad \text{(Equation 6)}$$

is considered, where $$\varepsilon(t, \tau) = \left|\sum_{i\in I_t} y_i(\tau) p_i d_i - \sum_{j\in\bar{I}_\tau} y_j(t) p_j d_j\right|^2 \quad \text{(Equation 7)}$$

As a prelude to describing the least-squares calibration method for this problem, a M-dimensional column vector (with the superscript "T" denoting transposition) is defined as follows $$d=[d_1 d_2 \ldots d_M]^T \quad \text{(Equation 8a)}$$

Also for $t<\tau$, let $$\tilde{y}_{t,\tau}^H=[0_{1\times M_{t-1}}\tilde{y}_t^T(\tau)0_{1\times(M_{\tau-1}-M_t)}-\tilde{y}_\tau^T(t)0_{1\times(M-M_\tau)}] \quad \text{(Equation 8b)}$$

where $$\tilde{y}_t^T(\tau)=[y_{M_{t-1}+1}(\tau)p_{M_{t-1}+1} y_{M_{t-1}+2}(\tau)p_{M_{t-1}+2} \cdots y_{M_t}(\tau) p_{M_t}]^T \quad \text{(Equation 8c)}$$

As a result, for $t<\tau$, the error term $\varepsilon(t,\tau)$ in (Equation 7) can be re-expressed as $$\varepsilon(t,\tau)=d^H R_{t,\tau} d \quad \text{(Equation 9)}$$

where $$R_{t,\tau}=\tilde{y}_{t,\tau}\tilde{y}_{t,\tau}^H \quad \text{(Equation 10)}$$

Consequently, we can re express $J_{cal}$ in (Equation 6) as follows $$J_{cal}(d)=d^H R d \quad \text{(Equation 11)}$$

where $$R = \sum_{t<\tau} R_{t,\tau} \quad \text{(Equation 12)}$$

with $R_{t,\tau}$ given by (Equation 10). The desired least-squares-based unit-norm estimate $\hat{d}$ is obtained via solving $$\hat{d} = \underset{d}{\operatorname{argmin}}[J_{cal}(d) - \lambda(\|d\|^2 - 1)] \quad \text{(Equation 13)}$$

and corresponds to the eigenvector of R in Equation 12 that is associated with the smallest eigenvalue of R. One embodiment of the pilot exchanges and calibration process is illustrated in FIG. 3. In this embodiment, R in Equation 12 is constructed sequentially as more observations become available. In particular, there is an intermediate matrix variable ΔR that is updated from one slot to the next, used to incrementally update R from one slot to the next. At the end of the pilot exchanges stored in the matrix variable R is the desired value listed in Equation 12. Then an eigen-decomposition is performed to obtain d̂ solution of Equation 13. Note that it is also possible to take advantage of the partially available R at intermediate stages of the pilot-exchange protocol in order to reduce the cost of the last step computation of Equation 13 at the cost of precision. Note for instance, that given all the pilot exchanges up to any slot τ, for any $1<\tau<T$, observations have been obtained that can be used for partial (or even full) calibration of the subset $\{I_t\}_{t=1}^{\tau}$. In one embodiment, after at the completion of the pilot exchanges after some slot τ, for some $1<\tau<T$, the calibration is restricted to take place in a D-dimensional subspace for some D<M. In one embodiment, this subspace is the subspace spanned by the D eigenvectors of the accumulated R up to slot τ, that are associated with the D smallest eigenvectors of the accumulated R up to slot τ. Consequently, after slot T, the problem in Equation 13 is augmented with the constraint that the vector d̂ has to be in the form of a linear combination of the D weakest eigenvectors of the accumulated R up to slot τ. This "projected" problem requires an eigen-decomposition of a D-dimensional matrix, and, since D<M, the augmented problem has lower complexity than solving Equation 13. However, since d̂ has been a priori constraint to reside on a D-dimensional subspace, the resulting solution is in general inferior to the one based on solving Equation 13.

Figure 13:
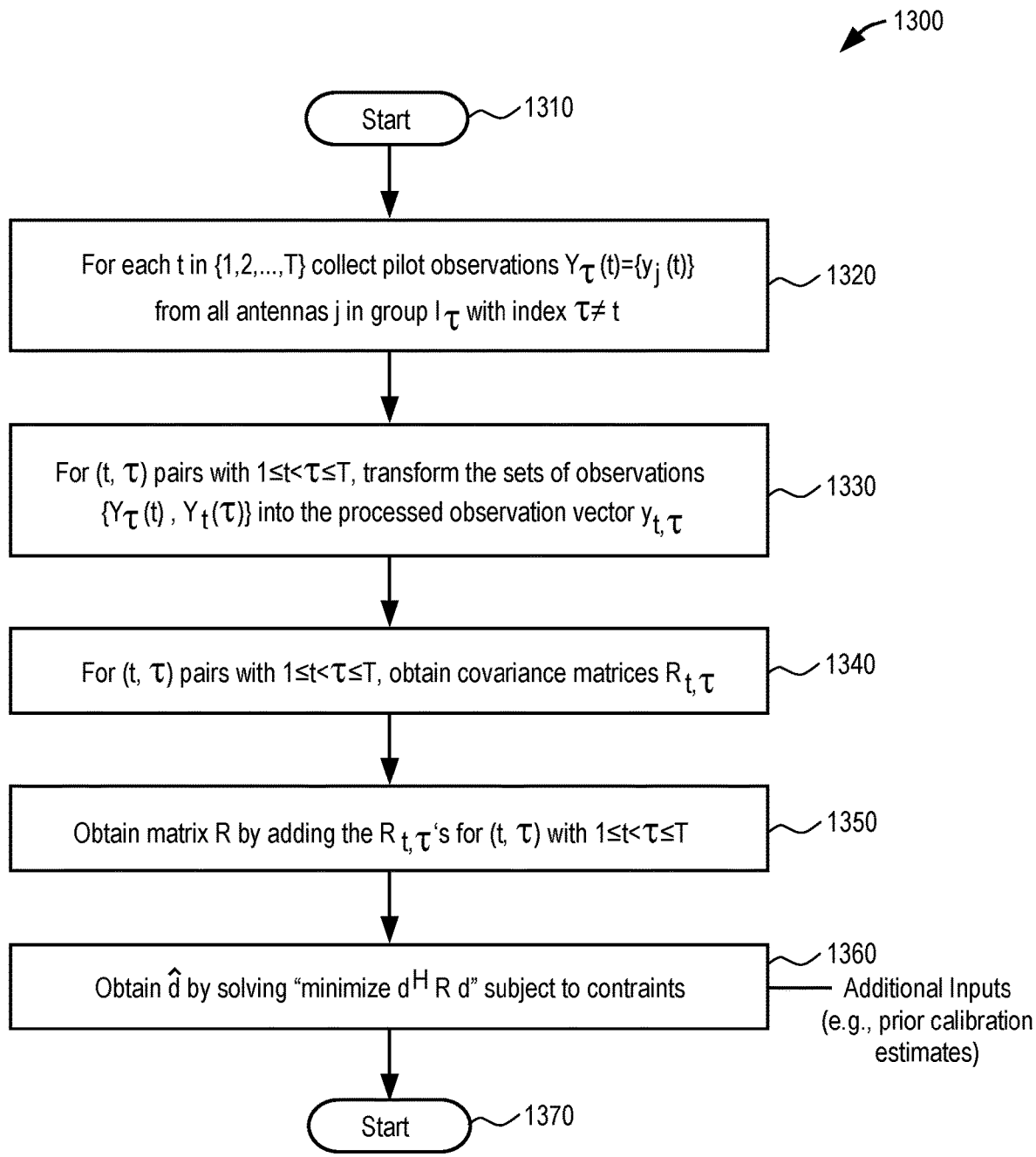
FIG. 13 is a flow diagram of one embodiment of a calibration process performed by a base station.

FIG. 13 is a flow diagram 1300 depicting a calibration process of one embodiment of a calibration mechanism performed by module 190 at a base-station. Referring to FIG. 13, for each calibration slot index t (i.e., a slot where the group of antennas $I_t$ simultaneously transmit pilots), the processor collects all pilot observations obtained by all antennas $j \in I_\tau$ for one or more indices τ for τ=t (step 1320). Note that antennas with index $j \in I_\tau$ for τ=t do not transmit pilots (and thus can collect observations) at time t. Subsequently, for (t,τ) pairs with $1 \le \tau \le T$, the sets of observations are transformed into the processed observation vector as shown in Equation 8b and in Equation 8c (step 1330). Subsequently, the base station calibration processor constructs $R_{t,\tau}$ for (t,τ) pairs with $1 \le \tau \le T$ as shown in Equation 10 (step 1340), and forms R in Equation 12 (step 1350). Finally, the calibration processor obtains d̂ as, e.g., the solution of Equation 13 (step 1360). In one embodiment, the calibration processor uses additional inputs in order to obtain d̂. In one embodiment, these inputs include estimates of individual groups of jointly calibrated antennas from previous calibration cycles. These inputs can be incorporated into the minimization problem of step 1360 in the form additional constraints that the d̂ solution must satisfy.

Properties of the Calibration Method based on Equation 13

The calibration method of Equation 13 has a number of other properties. Two issues are the array sizes that can be calibrated via Equation 13, and the signaling set options $\{K_t\}_{t=1}^{T}$ that can accomplish such relative calibration. In the following, all the noises are set to zero ($z_j(t)=0$ for all j and t) in Equation 3. Without loss of generality, it is assumed that the signaling set sizes $\{K_t\}_{t=1}^{T}$ are indexed in non-decreasing order (i.e., $K_t \le K_\tau$, for t<τ), and satisfy $\Sigma_{t=1}^{T} K_t = M$.

First, note that Equation 13 does not allow calibrating larger arrays than Avalanche. Indeed, in the absence of noise, the array can be relatively calibrated via solving Equation 13 if and only if the positive semi-definite matrix R in Equation 12 has a single eigenvalue equal to 0 (i.e., if and only if R has a one-dimensional null space). Since each of the $R_{t,\tau}$'s has rank at most one, the rank of the matrix R in Equation 12 is upper-bounded by T(T−1)/2, i.e., the number of (t,τ) pairs of integers for which $1 \le \tau \le T$. This implies that, with the one-shot calibration method based on solving Equation 13, at best arrays of size no larger than 1+T(T−1)/2 can be calibrated. Inspection of Equation 1 reveals that the same maximum M value, $M_{max}(T)$, which is an upper bound for Avalanche calibration, is also an upper bound for the one-shot calibration method based on solving Equation 13.

The next question of interest involves determining the $\{K_t\}_{t=1}^{T}$ sets satisfying $\Sigma_{t=1}^{T} K_t = M$, with $M \le M_{max}(T)$, for which the one-shot calibration method based on solving Equation 13 can relatively calibrate an array of size M. The set of signaling options for which method (Equation 13) allows calibration of the M-dimensional array (in the absence of noise) are captured in the text that follows in the form of Theorems 1 and 2. In particular, the theorems consider relative calibration of an M dimensional array based on the observation set in Equation 3, where the $p_i$'s are arbitrary non-zero (known) scalars, and $z_j(t)=0$ for all j and t (i.e., in absence of noise).

Theorem 1: Assume the $\vec{r}_i$'s, $\vec{t}_i$'s, and $h_{ij}$'s are unknown arbitrary complex non-zero scalars, and $z_j(t)=0$ for all j and t. If M>1+T(T−1)/2, or if there exists an $n \in \{1, 2, \ldots, T-1\}$, such that $$\sum_{t=1}^{n} K_{T+1-t} > nT - \frac{n(n+1)}{2} \qquad \text{(Equation 14)}$$

then the null-space of matrix R in (Equation 12) has rank greater than 1.

Theorem 1 establishes the fact that, much like with Avalanche calibration, calibration based on Equation 13 is not feasible if the array size M exceeds the value $M_{max}(T)$ in Equation 1. Also, considering the case n=1 in Theorem 1 reveals that, much like Avalanche, calibration via based on Equation 13 is not feasible if $K_T > T-1$.

The next theorem shows that if M does not exceed $M_{max}(T)$ in Equation 1, and if furthermore Equation 14 is false for all n, then, under fairly general conditions, calibration based on Equation 13 is feasible.

Theorem 2: Assume the $\vec{r}_i$'s, $\vec{t}_i$'s, and $h_{ij}$'s are 's are independent random variables, each from a continuous distribution, the $p_i$'s are arbitrary non-zero and known scalars, and $z_j(t)=0$ for all j and t. If $$\sum_{t=1}^{n} K_{T+1-t} \le nT - \frac{n(n+1)}{2} \qquad \text{(Equation 15a)}$$
$$\forall n \in \{1, 2, \cdots, T-1\}$$

and $$M \le T(T-1)/2 + 1 \qquad \text{(Equation 15b)}$$

then the null-space of matrix R in (Equation 12) has rank 1 with probability 1.

In summary, Theorems 1 and 2 together imply that calibration is possible based on solving Equation 13 if and only if Equations 15a and b hold.

It is worth comparing the signaling options based on which calibration is feasible via Equation 13, against the signaling options based on which Avalanche calibration is feasible. Note that the family of Avalanche signaling protocols for a given T (i.e., the signaling options for which array calibration is feasible with multistage Avalanche calibration) can be expressed in terms of the $\{K_t\}_{t=1}^T$ sets, as follows $$K^{aval}(T) = \{\{K_t\}_{t=1}^T; \text{ such that } K_1=1, \text{ and } K_{t-1} \leq K_t \leq t-1, \text{ for } t>1\} \quad \text{(Equation 16)}$$

Comparison of Equation 15 and Equation 16 reveals an important advantage of the method of Equation 13 with respect to Avalanche calibration: calibration based on meeting Equation 16 enables calibration of an M dimensional array with other signaling options, beyond Avalanche signaling (Equation 16). Specifically, with the one-shot calibration method (Equation 16), additional options of $\{K_t\}_{t=1}^T$ sets can be utilized for RF calibration, for which, of course, the corresponding M does not exceed the value $M_{max}(T)$ in (Equation 1).

One such choice involves "balanced" signaling, that is, signaling of the form where all the groups have (strictly or roughly) equal size, e.g., $K_t=K_o$ for all t, such that $1 \leq t \leq T$ with some T satisfying $T \geq 2K_o+1$. In the case $T=2K_o+1$, this yields a value of $M=M_{max}(T)-1$. One nice feature of such signaling options is that the pilot design, signaling and observations are symmetric across the antenna set. For example, to achieve M=10 with T=5, with multistage calibration, the only options $K^{avail}(5)$ are $\{1, 1, 2, 3, 3\}$, $\{1, 1, 2, 2, 4\}$, or $\{1, 1, 1, 3, 4\}$. The one-shot calibration method based on solving Equation 13 also allows calibration of the array by using a set of $\{K_t\}_{t=1}^T$ of the form $\{2, 2, 2, 2, 2\}$. Similarly, the combination of a $\{K_t\}_{t=1}^T$ set of the form $\{2, 2, 2, 2, 3\}$ and the one-shot calibration method based on solving Equation 13 allows calibration of an array of M=11 elements. On the other hand, Avalanche does not allow calibration with these signaling options. More important, as verified by simulations, in the presence of noise, these symmetric signaling options provide far improved calibration quality.

It also worth determining whether or not the $M_{max}(T)$ value in Equation 1 can be exceeded if other methods are allowed to be used for calibration, i.e., whether there exist other calibration methods which, given the observation set in Equation 3, can calibrate arrays with $M>M_{max}(T)$. The following theorem shows that the $M_{max}(T)$ value in Equation 1 cannot be exceeded given the observation set in Equation 3.

Theorem 3: Consider relative calibration of an M dimensional array based on the observation set in Equation 3, where the $\tilde{r}_i$'s, $\vec{t}_i$'s, and $h_{ij}$'s are unknown arbitrary complex non-zero scalars, the $p_i$'s are arbitrary known scalars, and $z_j(t)=0$ for all j and t. If $M>M_{max}(T)$, the array cannot be calibrated as there exist at least two d vectors, which are not collinear and are both consistent with the set of observations in Equation 3.

Recall that the one-shot calibration method of Equation 13 relies on a "data-processing" step to get from Equation 3 to Equation 5. Theorem 3 establishes that this data-processing step is not a limiting factor in terms of the maximum size of the array that can be calibrated based on observation of Equation 3.

Signaling Embodiments

The following discusses signaling embodiments associated with RF calibration based on Equation 13. Given a value of M, let $T_{min}(M)$ denote the smallest value of T for which $M_{max}(T)$ is at least as large as M. A class of signaling embodiments that allows reliable calibration of an array of size M uses T slots for calibration where T equals either $T_{min}(M)$ or $T_{min}(M)+1$. Given such a value of T, let $K_o = \lfloor M/T \rfloor$, and $R_0 = M - K_o T$. The following class of signaling embodiments can be used to calibrate the size M array:

$$K_t = \begin{cases} K_o & \text{if } 1 \leq t \leq T - R_o \\ K_o + 1 & \text{if } T - R_o < t \leq T \end{cases} \quad \text{(Equation 17)}$$

Given the cardinality of the sets, i.e., given $\{K_t\}_{t=1}^T$, such as e.g., in Equation 17, there are many ways to split a set of antenna elements I into sets $\{I_t\}_{t=1}^T$ such that $|I_t|=K_t$ for all t. One convenient way for selecting these $\{I_t\}_{t=1}^1$ sets with roughly equal antenna elements per set can be obtained via the notion of sub-lattices taking into account the given antenna geometry. In one embodiment having square patches of arrays, an L×L patch array of $M=L^2$ elements is to be calibrated. Sub-lattices on a rectangular grid can be defined for any pair of integers, $(n_1, n_2)$, yielding a minimum distance-squared between elements in the sub-lattice equal to $d^2=n_1^2+n_2^2$, and dividing the rectangular grid into $d^2$ groups. Consequently, given M, and correspondingly $T_{min}(M)$, any $(n_1, n_2)$ combination yielding $d^2 \geq T_{min}(M)$ induces a partitioning of the M antenna elements into $T=d^2$ groups of roughly equal size. In one embodiment, these are used as the signaling antenna groups $\{I_t\}_{t=1}^T$.

Figures 5, 6:
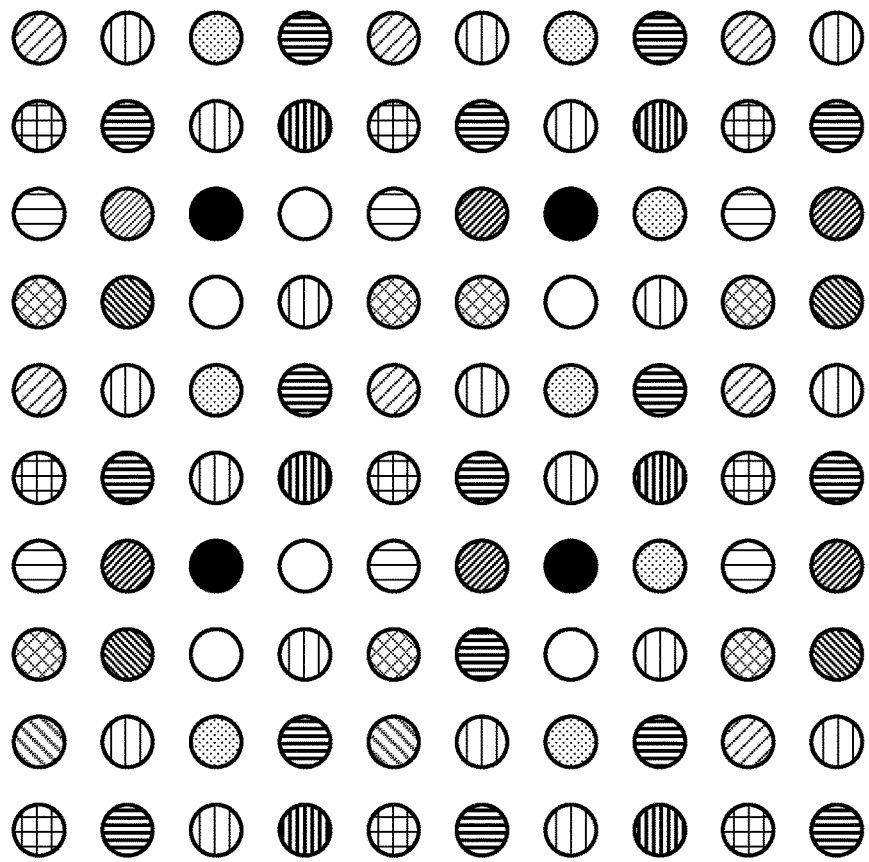
FIG. 5 illustrates calibration pilot signaling and observation collection for the antenna partitioning in FIG. 4.
FIG. 6 illustrates one embodiment of a signaling group partitioning for a 10×10 antenna array patch using 16 slots.

FIG. 4 and FIG. 5 consider a calibration signaling embodiment for a 6×6 patch of M=36 antennas. Given that $T_{min}(36)=9$, there are $(n_1, n_2)$ combinations to consider yielding $d^2 \geq 9$. FIG. 4 considers a $(n_1=3, n_2=0)$ lattice combination, yielding a partitioning of the 36 antennas into $d^2=9=T_{min}(36)$ groups, with each group comprising 4 antennas. In FIG. 4, each antenna in a particular group of 4 antennas has the same cross-hatching pattern. For example, each antenna in the group 401, i.e., each of the 4 antennas 401 in FIG. 4 has its closest same-group neighbors at distance d=3 (three elements to the left, or right, or top, or bottom). The same is true regarding closest same-group neighbors for each of the other eight antenna (color) groups in FIG. 4.

FIG. 5 explicitly shows the calibration signaling associated with the antenna partitioning in FIG. 4. There are $T=d^2=9$ slots. Each of the nine slots is associated with one of the nine groups of antennas for transmission of pilots. In each slot, each antenna is either broadcasting a pilot (TX) or collecting an observation (RX). In particular, in each slot, the four antennas of the group associated with the slot simultaneously broadcast calibration pilots. The remaining 32 antennas each collect an observation of this simultaneous pilot broadcast. The 32×9 observations are turned into 36 pairs of processed observations of the form of Equation 5, and can be used in pairs to construct 36 matrices of the form of Equation 10, and in turn a single matrix R of the form of Equation 12. The eigenvector of the 36-dimensional matrix R that is associated with the smallest eigenvalue provides the desired calibration coefficients.

Figure 7:
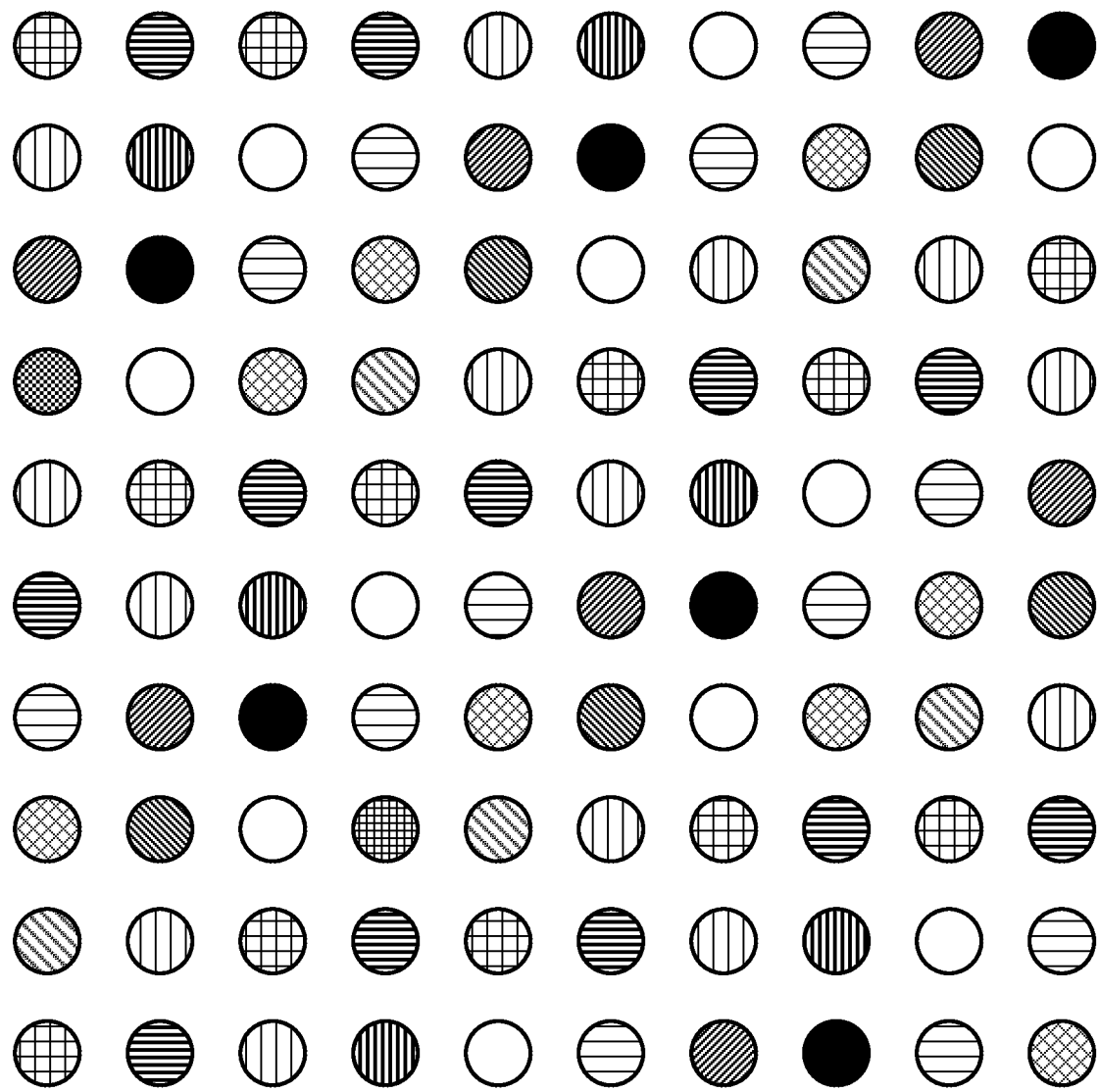
FIG. 7 illustrates one embodiment of a signaling group partitioning for a 10×10 antenna array patch using 17 slots.

FIG. 6 and FIG. 7 consider signaling embodiments for a 10×10 patch of M=100 elements. Only $(n_1, n_2)$ pairs yielding $d^2 \geq 15$ are considered, since $T_{min}(100)=15$. Referring to FIGS. 6 and 7, all antennas in the same antenna groups in FIGS. 6 and 7 have the same cross-hatching pattern. FIG. 6 is based on $(n_1=4, n_2=0)$, yielding T=16 slots, while FIG. 7 is based on $(n_1=4, n_2=1)$, yielding T=17 slots.

Figure 8:
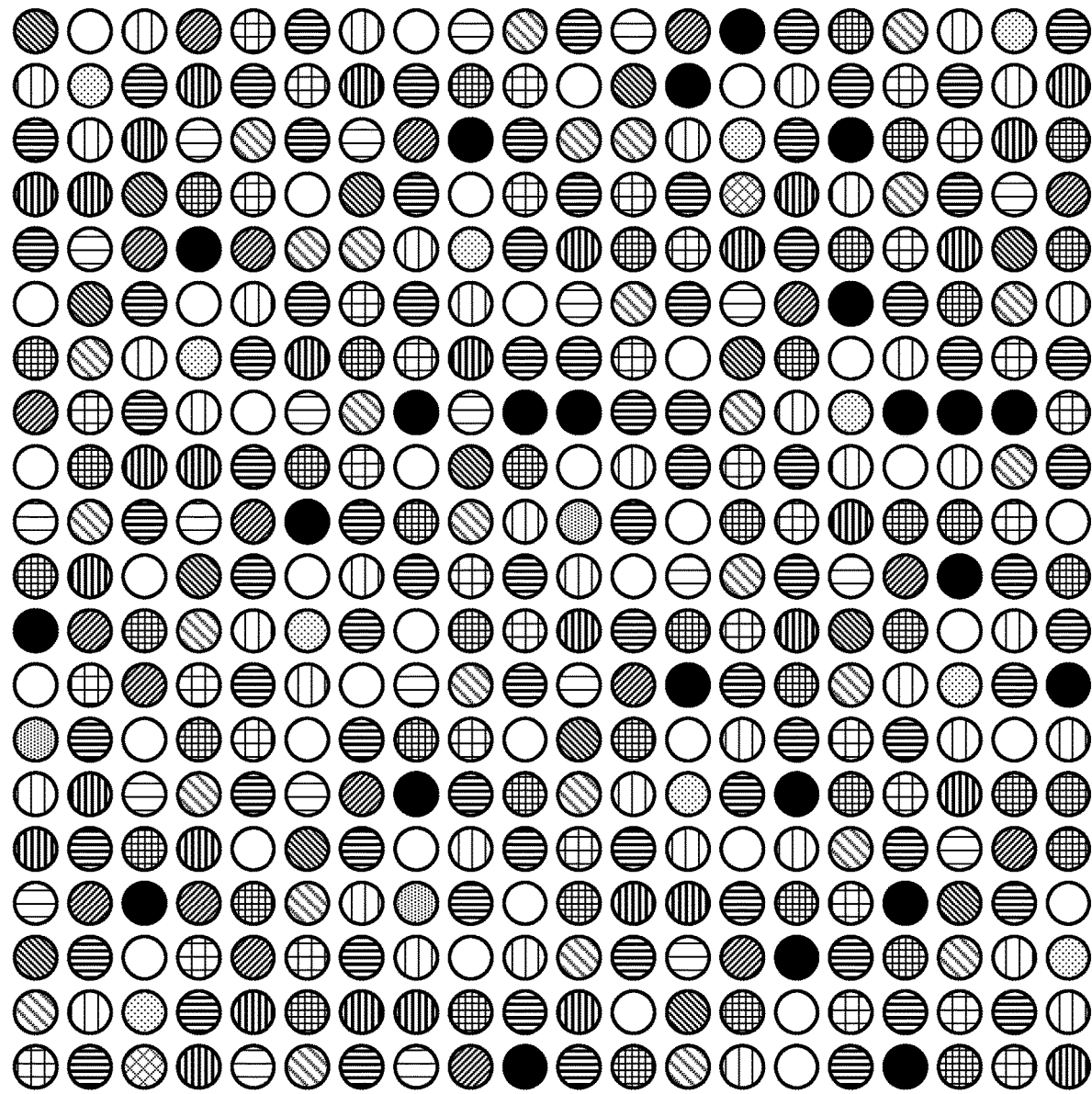
FIG. 8 illustrates one embodiment of a signaling group partitioning for a 20×20 antenna array patch using 29 slots.

FIG. 8 illustrates a signaling embodiment for a 20×20 patch array of M=400 elements. It is based on ($n_1$=5, $n_2$=2) and uses T=29 slots to calibrate the array (note that $T_{min}$(400)=29). Referring to FIG. 8, all antennas in the same antenna group have the same cross-hatching pattern.

Figure 9:
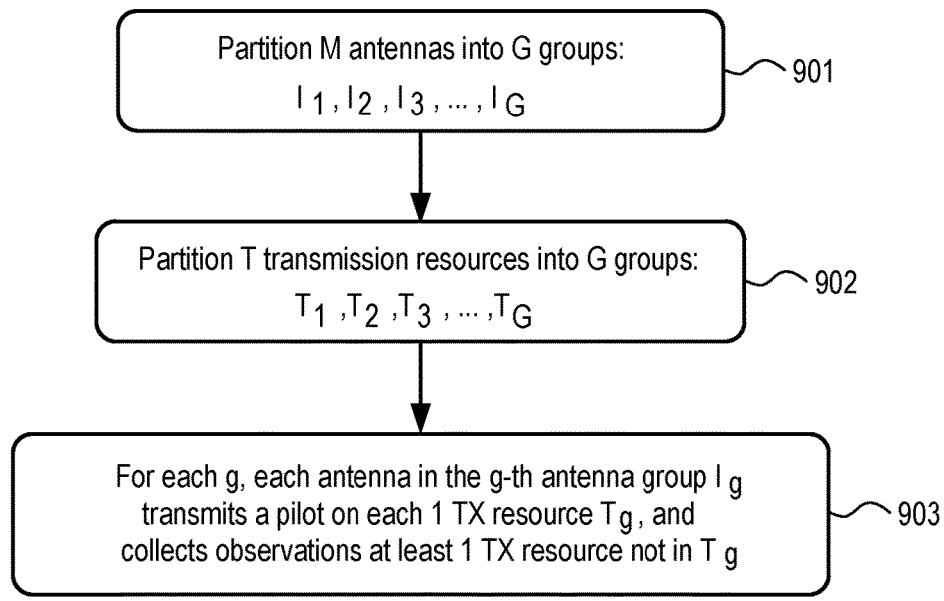
FIG. 9 illustrates an example of more general group partitioning and pilot exchanges in accordance with one embodiment.

Although the preceding description of the signaling protocols has only focused on group partitioning of FIG. 2, the calibration methods discussed above can operate with a broader family of group partitioning schemes, such as the ones illustrated in FIG. 9. Many of the signaling protocols in the following sections belong to the family ones illustrated in FIG. 9. Referring to FIG. 9, the process starts by processing logic partitioning M antennas into G groups: $I_1$, $I_2$, $I_3$, ..., $I_G$ (processing block 901). The process continues by processing logic partitioning T transmission resources into G groups: $\mathcal{T}_1$, $\mathcal{T}_2$, $\mathcal{T}_3$, ..., $\mathcal{T}_G$ (processing block 902). For each g, each antenna in the g-th antenna group $I_g$ uses processing logic to transmit a pilot on at least 1 TX resource in $\mathcal{T}_g$ and collect observations on at least 1 TX resource not in $\mathcal{T}_g$ (processing block 903), completing the process.

Signaling Protocols and Calibration Methods for the General N Case

The disclosed calibration methods for the case N=1 can be extended to the case N>1. With N>1, it is important to distinguish embodiments of the invention in terms of the relation of the coherence bandwidth of the base station-base station antenna channels that are getting calibrated, F, and N. We first consider the case where the coherence bandwidth of the base station-base station antenna channels F is larger than or equal to N.

Embodiments for the Case F≥N

Consider a partition of a set I={1, 2, ..., M} of M base station antennas into TN groups. Letting $K_{t,n}$ denote the size of the (t,n)-th group (with $M = \sum_{t=1}^{T}\sum_{n=1}^{N} K_{t,n}$), without loss of generality, let the (t,n)-th set comprise the following nodes $$I_{t,n} = \{j \in I | M_{(t-1)N+(n-1)} < j \leq M_{(t-1)N+n}\} \quad \text{(Equation 18a)}$$

where $$M_\ell = \quad \text{(Equation 18b)}$$
$$\begin{cases} \sum_{t=1}^{\lfloor \ell/N \rfloor} \sum_{n=1}^{N} K_{t,n} + \sum_{n=1}^{rem(\ell,N)} K_{\lceil \ell/N \rceil,n} & \text{if } 1 \leq \ell \leq NT \\ 0 & \text{if } \ell = 0 \end{cases}$$

We also let $\bar{I}_t$ denote the compliment of $\cup_{n=1}^{N} I_{t,n}$.

In (calibration) slot (t, n), for each t∈{1, 2, ..., T} and each n∈{1, 2, ..., N}, the nodes in the (t, n)-th set $I_{t,n}$ simultaneously transmit pilots. We let $p_i$ denote the (non-zero and real-valued, without loss of generality) scalar pilot transmitted by node i in the set $I_{t,n}$ in slot t.

In slot (t, n), for each t∈{1, 2, ..., T} and each n∈{1, 2, ..., N}, each node in $\bar{I}_t$ collects an observation. The observation that node j∈$I_{\tau,m}$ obtains at time t, for τ≠t, and any m is given by $$y_j(t) = \sum_{i \in I_{t,n}} \tilde{r}_j p_i \tilde{t}_i h_{ij} + z_j(t) \quad \text{(Equation 19)}$$

Assuming the time difference between any pair of calibration slots is within (i.e., no larger than) the coherence time and coherence bandwidth of the base station antenna to base station antenna channels, all base station antenna to base station antenna channels are reciprocal, i.e., $h_{ij} = h_{ji}$, for all i, j∈I with i≠j.

Expressing both sides of Equation 19 in a manner similar to Equation 4, then scaling both sides of this equation by $p_j d_j$, and then summing over all j∈$I_{\tau,m}$ we obtain $$\sum_{j \in I_{\tau,m}} y_j(t) p_j d_j = \sum_{i \in I_{t,n}} \sum_{j \in I_{\tau,m}} p_i p_j d_i d_j u_{ij} + \sum_{j \in I_{\tau,m}} z_j(t) p_j d_j \quad \text{(Equation 20a)}$$

Similarly, based on the observations collected by all nodes i∈$I_{t,n}$ at time τ, the following is obtained $$\sum_{i \in I_{t,n}} y_i(\tau) p_i d_i = \sum_{i \in I_{t,n}} \sum_{j \in I_{\tau,m}} p_i p_j d_i d_j u_{ij} + \sum_{i \in I_{t,n}} z_i(\tau) p_i d_i \quad \text{(Equation 20b)}$$

Consequently, a squared-error function of the form $$J_{cal}(d_1, d_2, \cdots, d_M) = \sum_{\substack{(t,n,\tau,m): \\ 1 \leq t < \tau \leq T \\ 1 \leq n, m \leq N}} \varepsilon(t, n, \tau, m) \quad \text{(Equation 21a)}$$

can be considered, where $$\varepsilon(t, n, \tau, m) = \left| \sum_{i \in I_{t,n}} y_i(\tau) p_i d_i - \sum_{j \in I_{\tau,m}} y_j(t) p_j d_j \right|^2 \quad \text{(Equation 21b)}$$

Clearly, finding the calibration vector that minimizes the error function in Equation 21a can then be accomplished along the same lines as in the case of the error function in Equation 6. The desired least-squares-based unit-norm estimate $\hat{d}$ corresponds to the eigenvector of R in that is associated with the smallest eigenvalue of R, and where $$R = \sum_{t < \tau} \sum_{n=1}^{N} \sum_{m=1}^{N} R_{t,n,\tau,m} \quad \text{(Equation 22)}$$

with the rank-one matrix $R_{t,n,\tau,m}$ defined similarly to $R_{t,\tau}$ in Equation 10.

The properties of this calibration method for the general N case are straightforward extensions to those of the case N=1 given by Equation 13. For instance, in the absence of noise, the array can be relatively calibrated by this method if and only if the positive semi-definite matrix R in Equation 22 has a single eigenvalue equal to 0 (i.e., if and only if R has a one-dimensional null space). Since each of the $R_{t,n,\tau,m}$'s has rank at most one, the rank of the matrix R in Equation 22 is upper-bounded by $N^2 T(T-1)/2$, i.e., the number of (t, n), (τ, m) pairs of integers for which 1≤t<τ≤T. This implies that the maximum array size that can be calibrated is $$M_{max}(T,N) = N^2 T(T-1)/2 + 1 \quad \text{(Equation 23)}$$

Similarly to the case N=1, balanced signaling, not only allows calibration, but it yields superior calibration quality than the inherently uneven signaling options allows by Avalanche. Given an N, and a value of T sufficiently large so that the corresponding $M_{max}(T, N)$ value from (Equation 23) is larger than the array size that is to be calibrated, let $K_o = \lfloor M/(NT) \rfloor$, and $R_o = M - K_o NT$. The following class of signaling embodiments can be used to calibrate the size M array:

$$K_{t,n} = \begin{cases} K_o & \text{if } 1 \le (t-1)N + n \le NT - R_o \\ K_o + 1 & \text{if } NT - T_o < (t-1)N + n \le NT \end{cases} \quad \text{(Equation 23)}$$

Finally, signaling embodiments similar to those shown in FIG. 4-FIG. 8 can be also developed with N>1. As one example consider calibrating a 20×20 patch array of M=400 elements the case N=4. In this case, inspection of Equation 23 reveals that the minimum T required is 8. Using a lattice based on ($n_1$=4, $n_2$=4) yields $d^2$=NT=32 signaling groups complying with the minimum T=8 value.

In one embodiment, signaling embodiments in which the number of tones in each OFDM calibration symbol varies with t are used. Letting $N_t$ denote the number of tones used in the t-th OFDM calibration symbol (and assuming F is at least as large as the maximum of $N_t$'s), the maximum array size that can be calibrated is $$M_{max}(N_1, N_2, \cdots, N_T) = 1 + \sum_{1 \le t < \tau \le T} N_t N_\tau \quad \text{(Equation 25)}$$

Such signaling embodiments are useful in the context of calibrating massive local arrays alone or in combination with non-collocated arrays.

Figure 10:
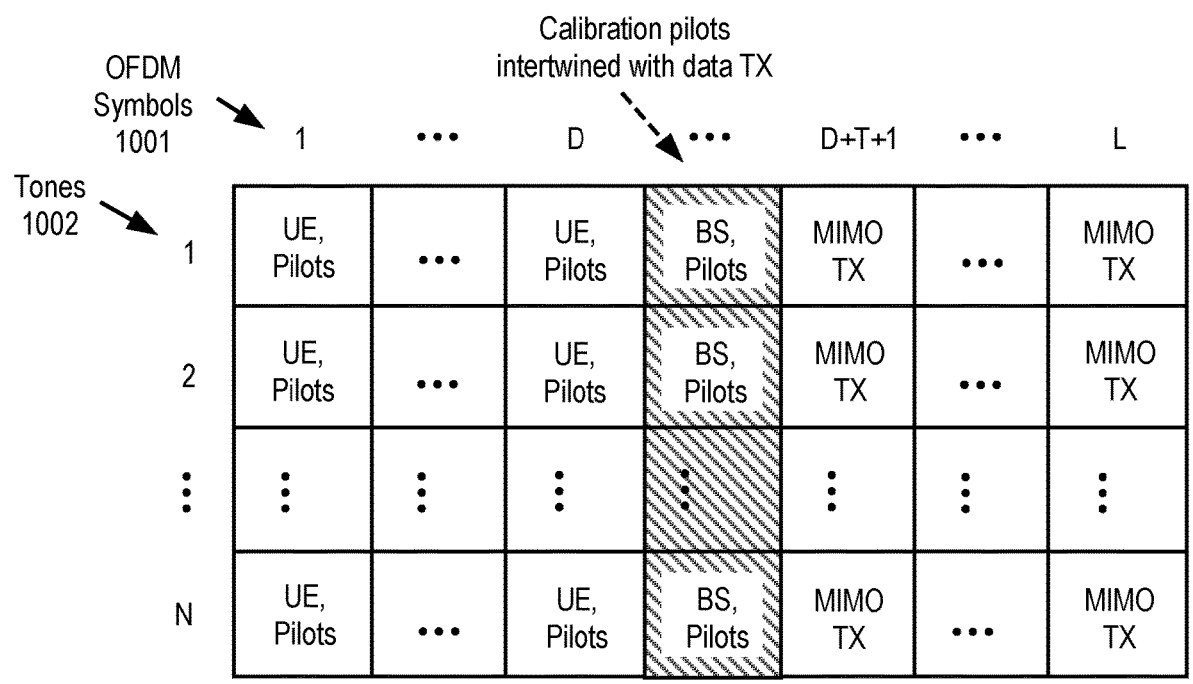
FIG. 10 illustrates calibration pilots intertwined with data transmission.

Minimizing the Duration of the Signaling Required to Calibrate Collocated Arrays With TDD/OFDMA-based systems employing reciprocity based MIMO transmission, OFDM symbols dedicated for UL pilot transmission precede DL OFDM data symbols. Typically one or more OFDM symbol slots are left free in between UL OFDM symbols and DL OFDM data symbols, in order to allow base stations to compute the MIMO precoders that are to be used for DL data transmission, as well as to provide sufficiently long guard bands for switching between UL and DL transmission. These resources are naturally suited as calibration signaling resources. In one embodiment, this transmission format is illustrated in FIG. 10.

Although the same OFDM symbol structure can be used for calibration training, it may be beneficial to change this structure. First, the circular prefix used for UL pilot/DL data transmission is used to ensure that there is no inter-symbol interference for the macro/small cell scenario of interest. Since the calibration pilots are exchanged between closely located antennas, such large circular prefixes are not needed. Hence, it is preferable to use a different OFDM structure for calibration pilots. Guard bands that are a few samples long are still needed between OFDM symbols from one calibration slot to the next, as there is a need for some antennas to switch between transmit and receive mode. Letting Δ denote the number of samples at the Pulse-Amplitude Modulation (PAM) rate that need to be expended per OFDM symbol for CP and guard bands, an OFDM symbol of N tones requires N+Δ samples at the PAM rate.

Hence, letting $N_t$ denote the number of tones used in the t-th OFDM calibration symbol, the duration of the calibration signaling in PAM samples is given by $$\theta(N_1, N_2, \cdots, N_T; \Delta) = T\Delta + \sum_{1 \le t \le T} N_t \quad \text{(Equation 26)}$$

In one embodiment, balanced signaling is employed for a given T and given set of $N_t$. The choice of T and the corresponding set of $N_t$ values are chosen that the array of size M for a given M can be calibrated sufficiently accurately and θ in Equation 26 is kept as small as possible. In one embodiment, the array is considered sufficiently accurately calibrated if $M_{max}$ in Equation 25 exceeds M by some predetermined (small value), δ. For a given value of T, it can be shown that θ in Equation 26 is minimized if the $N_t$ values are as balanced as possible, that is, $N_t$ for each t equals either N or (N−1) for some appropriate N. Using Equation 23, this value of N is given via $$N = N(T) = \left\lceil \sqrt{\frac{2(M + \delta - 1)}{T(T-1)}} \right\rceil \quad \text{(Equation 27)}$$

Then one can consider signaling such that $N_t$ equals N(T) for R out of the T OFDM symbols and N(T)−1 for the remaining T−R OFDM symbols. Clearly, the smaller the R value the smaller the θ value in Equation 26. Hence one can pick as R(T) the minimum value of R for which $M_{max}$ in Equation 25 exceeds M+δ. Letting θ(T, N(T), R(T)) denote the corresponding θ value, where $$\theta(T,N,R) = T\Delta + (N-1)T + R \quad \text{(Equation 28)}$$

In one embodiment, the value of T is chosen so as to minimize the value of θ, i.e., $$T_{opt} = \underset{T \ge 2}{\text{argmin}} \; \theta(T, N(T), R(T)) \quad \text{(Equation 29)}$$

In one set of embodiments, only $N_t$ values from a prespecified set of values are allowed. In one embodiment, $N_t$ is allowed to only take values that are powers of 2, e.g., 1, 2, 4, . . . . In these cases, for each T, the set of $N_t$ values that can calibrate the array sufficiently accurately with the smallest value of θ are retained, and the value of T is chosen so as to minimize the value of θ, similar to Equation 29.

Embodiments for the Case F<N

The disclosed methods can be also readily extended to the case that the coherence bandwidth of the base station to base station antenna channels equals F, and where F is smaller than N.

For the case where F>1, a straightforward extension involves constructing R using only (t, n) (τ, m) pairs within the coherence bandwidth, i.e., $$R = \sum_{t < \tau} \sum_{\substack{1 \le n, m \le N \\ |n-m| < F}} R_{t,n,\tau,m} \quad \text{(Equation 30)}$$

The maximum array size that can be calibrated in this case is one plus the number of $R_{t,n,\tau,m}$ terms in Equation 30 and is given by $$M_{max}(T,N,F) = NFT(T-1)/2 + 1 \quad \text{(Equation 31)}$$

In the case F=1, note that if the antenna elements are partitioned in non-overlapping sets as in Equation 18, calibration of the whole array is not possible in this case. In particular, note that, for each tone n, the set of antenna elements $\cup_{t=1}^{T} I_{t,n}$ can be jointly calibrated based on all observations collected on tone T if the set $\{K_{t,n}\}_{t=1}^{T}$ satisfies Equation 16 in Theorem 1. However, as there are no pairwise observations between $\cup_{t=1}^{T} I_{t,n}$ and $\cup_{t=1}^{T} I_{t,m}$ that can be used to jointly calibrate these sets (since F=1), these sets can no longer calibrated with one another.

In this case, additional calibration resources are needed to jointly calibrate these sets of antennas.

In an alternative approach, "double" elements, i.e., elements that transmit in multiple bands, thereby deviating from the non-overlapping sets partitioning in Equation 18. For instance, to ensure that $\cup_{t=1}^{T} I_{t,n}$ and $\cup_{t=1}^{T} I_{t,m}$ can be jointly calibrated requires one such "double" element is needed, that is an element that is common in both set (this of course reduces the total number of unique antenna elements by 1). A simple counting argument reveals that N−1 is the minimum number of double elements to allow calibration of the whole array. Consequently, for the case F=1, using the RHS of Equation 1 multiplying by N, and subtracting the necessary N−1 double elements yields $$M_{max}(T,N,1) = N[T(T-1)/2+1] - (N-1) = N[T(T-1)/2] + 1 \quad \text{(Equation 32)}$$

which agrees with Equation 31, when evaluated at F=1. Hence, Equation 31 applies to all F for which, $1 \leq F \leq N$.

Minimizing the Duration of the Signaling that Calibrates Collocated Arrays with F=1

Similarly to the section described above, in one embodiment, the signaling duration of calibration is reduced, and potentially minimized, in the case F=1. Letting Δ denote the number of samples at the Pulse-Amplitude Modulation (PAM) rate that need to be expended per OFDM symbol for circular prefix (CP) and guard bands, an OFDM symbol of N tones requires N+Δ samples at the PAM rate.

Hence, the duration of the calibration signaling in PAM samples is given by $$\theta(T,N;\Delta) = T(N+\Delta) \quad \text{(Equation 33)}$$

Assume again that an array of size M is to be calibrated and that the array is considered sufficiently accurately calibrated if $M_{max}$ in Equation 32 exceeds M by some predetermined (small value), δ. For a given value of T, using Equation 23, the required value of N is given via $$N = N(T) = \left\lceil \frac{M + \delta - 1}{T(T-1)/2} \right\rceil \quad \text{(Equation 34)}$$

Hence, the best value of T is the one that minimizes $\theta(T, N(T); \Delta)$, i.e., $$T_{opt} = \underset{T \geq 2}{\operatorname{argmin}} T\left(\left\lceil \frac{M + \delta - 1}{T(T-1)/2} \right\rceil + \Delta\right) \quad \text{(Equation 35)}$$

As an example, consider calibrating an array of size M=400 elements, with δ=20 elements. Assuming Δ=4 samples is required, and, the best (T, N) combination from Equation 35, is (T=15, N=4). In contrast, if Δ=16 samples is required, the best (T, N) combination from Equation 34, is (T=8, N=15).

Fast Calibration in the Context of Distributed and Massive MIMO and F=1.

Embodiments are presented below which allow fast and reliable calibration of dense Massive-MIMO deployments for coordinated multipoint transmission (CoMP), including distributed Massive MIMO transmission. In such embodiments, it is necessary to assign pilots in a coordinated fashion to enable fast and efficient calibration. Disclosed embodiments can be used to calibrate sets of antennas, where different antennas, or, groups of antennas, are driven by different local oscillators (LOs). In this case, (timing/frequency/carrier) synchronization is also required.

Next one class of embodiments are presented that can be used to jointly calibrate massive arrays across the coverage area to enable coordinated multipoint transmission (CoMP) and its special case of distributed Massive MIMO. Considering the fact that collocated arrays are driven from a single clock, while elements on different sites may be driven by distinct clocks, calibration is required at two different times scale. Calibrating local arrays is required at a coarse time scale (e.g., in the order of minutes), while calibrating elements on different arrays is required at a finer time scale (e.g., possibly in the order of msecs). However, given that the local massive arrays (driven by a common LO) have been calibrated already, jointly calibrating two such massive arrays only requires jointly calibrating a pair of "reference" antenna elements, one per array.

In this section we assume that the local arrays have been calibrated already and we focus on the problem of calibrating a field of non-collocated reference (single-antenna) elements. Calibration techniques are disclosed for perform calibration at the (faster) synchronization rate. In one embodiment, calibration is performed (or adjusted) periodically at the same rate as synchronization, and right after synchronization has been established. This decoupling of synchronization and calibration provides more flexibility and allows tailoring the calibration waveforms and signaling to accommodate efficient calibration.

In principle, an appropriate subset of the techniques presented herein can be used for calibrating the sets of non-collocated (reference) antenna elements. First, note that since there is in general significant multipath between antenna elements (and possibly NLOS) the relevant techniques correspond to the case F=1. T and N can be in principle designed to minimize θ as discussed above. One key difference here is that a much larger Δ value is required (to account for the maximum multipath delay spread).

The enormous flexibility in selecting the transmitting group sets associated with the calibration methods that are disclosed herein becomes extremely useful in calibrating distributed arrays. In one class of embodiments, the solution to Equation 35 is used as a first order approximation for choosing the T, and N values to use and other factors are considered for making the final choices. For example, consider a square grid of 18×18=324 massive arrays. With Δ=32 samples, the optimal choices are given by solving Equation 33 as T=6, and N=23, yielding calibration signaling duration θ=330 samples. We note however that 18×18 grid of 324 massive arrays can be split into 9 6×6 patches of 36 massive arrays each. Recalling that only a single element need be calibrated per site, and that from FIG. 2 that such a patch can be calibrated with T=9 on a single tone, in one embodiment T=9 is used. Note that via (Equation 33) the minimum N required to calibrate the array is N=10. In one embodiment, 9 tones are used to calibrate the 9 6×6 patches individually, and in parallel. Finally, one more tone can be used for jointly calibrating the patches.

Note that there is a lot of freedom in selecting the subset of reference antennas that transmit on the 10-th tone due to the flexibility of signaling with the proposed methods. In one embodiment, a single reference antenna is selected per calibrated 6×6 patch to signal on the 10th tone. This antenna forms a signaling group in its own right and is provided a resource element for transmission on the 10-th tone and one of the 9 OFDM symbols. The only requirement is that if the resource element provided on the 10th tone for transmission by the selected antenna for the i-th 6×6 patch (out of 9) is on the k-th symbol (out of 9 OFDM symbols), the selected element has to be among the 4 group-element of the patch that has assigned a transmission resource on the i-th tone of the k-th OFDM symbol. Given that the 9 patches have been individually calibrated with the disclosed methods, calibrating the 9 selected elements together on the tenth tone allows then to calibrate the whole array together via hierarchical calibration.

However, other classes of superior embodiments are also made possible by the disclosed calibration methods. In one embodiment, several elements per patch are used for signaling and joint calibration on the 10-th tone. Calibration in this case can proceed in a number of different ways. In one embodiment, a single R matrix is formed based on the whole set of observations over the N×T tones, and is used to jointly calibrate the patches jointly (e.g., by finding the eigenvector associated with the smallest eigenvalue of R). In an alternative embodiment, hierarchical calibration can also be implemented. Given calibration of each of the 9 6×6 patches, an additional step computes joint calibration of these patches based on the following variation of the disclosed methods. First, each of the (324) reference antenna elements in the whole (18×18) patch are indexed via a triplet (n,t,k) denoting the k-th antenna transmitting a pilot on the n-th tone (n=1, 2, . . . , N−1) and t-th OFDM symbol (with t=1, 2, . . . , T). In this example N=10, T=9. Also, for each (n,t) combination (with n=1, 2, . . . , N−1, and t=1, 2, . . . , T), k takes the values {1, 2, 3, 4}. Letting $d_{(n,t,k)}$ denote the calibration coefficient of reference antenna element (n,t,k), calibration of the n-th 6×6 antenna patch is an equivalent to knowing $d_{(n,t,k)}$ for all t and k up to an unknown complex scalar, i.e., the following:

$$d_{(n,t,k)} = \hat{d}_{(n,t,k)} \alpha_n \quad \text{(Equation 36)}$$

where $\hat{d}_{(n,t,k)}$ is known and $\alpha_n$ is unknown. On the resource element corresponding to the N-th tone and OFDM symbol t, each antenna (n,t,k), for all n=1, 2, . . . , N−1, and each k broadcasts a pilot.

Figures 11, 12:
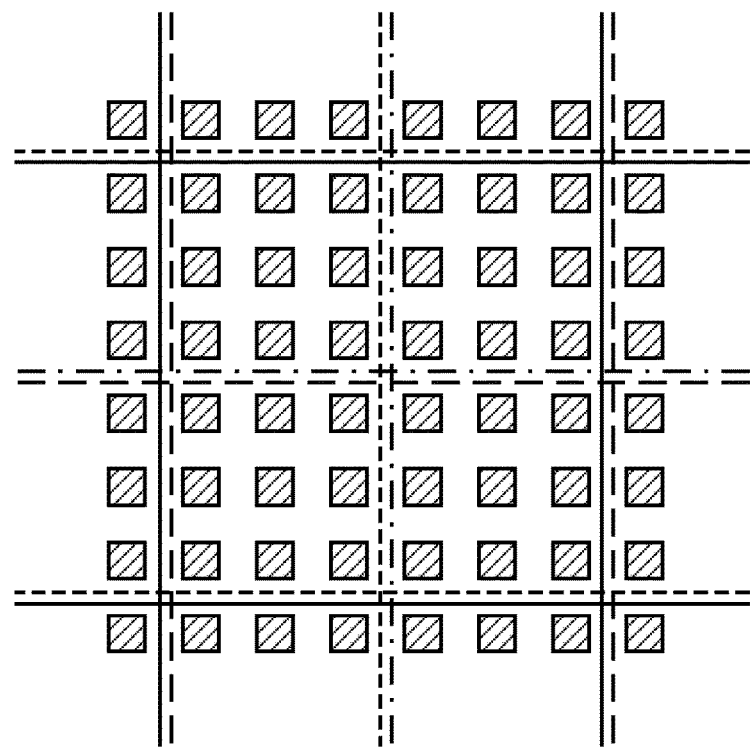
FIG. 11 illustrates one embodiment of a signaling protocol for hierarchical calibration.
FIG. 12 illustrates a set of overlapped tessellations each one partitioning the space into a number of patches.

One embodiment of the signaling protocol is illustrated in FIG. 11.

Then each antenna in the set (m,τ, $\ell$) for each τ≠t, each m=1, 2, . . . , N−1, and each $\ell$ receives the following observation on tone N and OFDM symbol t:

$$y_{(m,\tau,\ell)}(N, t) = \quad \text{(Equation 37)}$$

$$\sum_{n=1}^{N-1} \sum_k \vec{r}_{(m,\tau,\ell)} p_{(n,t,k)}(N) \vec{t}_{(n,t,k)} h_{(n,t,k)(m,\tau,\ell)}(N) + z_{(m,\tau,\ell)}(N, t)$$

where $h_{(n,t,k)(m,\tau,\ell)}(N)$ is the channel between antenna elements (n,t,k) and (m,τ, $\ell$) on OFDM tone N, and $p_{(n,t,k)}(N)$ is the pilot transmitted by antenna element (n,t,k) on tone N. This can be re-written as $$y_{(m,\tau,\ell)}(N, t) = \quad \text{(Equation 38a)}$$

$$\sum_{n=1}^{N-1} \sum_k p_{(n,t,k)}(N) d_{(n,t,k)} u_{(n,t,k)(m,\tau,\ell)}(N) + z_{(m,\tau,\ell)}(N, t)$$

where $$u_{(n,t,k)(m,\tau,\ell)}(N) = u_{(m,\tau,\ell)(n,t,k)}(N) = \vec{r}_{(m,\tau,\ell)} \vec{r}_{(n,t,k)}$$
$$h_{(n,t,k)(m,\tau,\ell)}(N) \quad \text{(Equation 38b)}$$

and $$d_{(n,t,k)} = \vec{t}_{(n,t,k)} / \vec{r}_{(n,t,k)} \quad \text{(Equation 38c)}$$

Using (Equation 36), scaling both sides of Equation 38a by $p_{(m,\tau,\ell)}(N) d_{(m,\tau,\ell)}$, and summing over all m, and all $\ell$, we obtain $$\sum_{m=1}^{N-1} \sum_\ell y''_{(m,\tau,\ell)}(N, t) \alpha_m = \quad \text{(Equation 39a)}$$

$$\sum_{m,n} \alpha_m \alpha_n \sum_{k,\ell} u''_{(n,t,k)(m,\tau,\ell)}(N) + \text{noise}_1$$

where $u''_{(n,t,k)(m,\tau,\ell)}(N) = u_{(n,t,k)(m,\tau,\ell)}(N) p_{(n,t,k)}(N) p_{(m,\tau,\ell)}(N)$ $\hat{d}_{(n,t,k)} \hat{d}_{(m,\tau,\ell)}$, and where in addition $y''_{(m,\tau,\ell)}(N,t) = y_{(m,\tau,\ell)}(N,t) p_{(m,\tau,\ell)}(N) \hat{d}_{(m,\tau,\ell)}$.

Similarly, based on the observations collected by all nodes at time τ, the following is $$\sum_{n=1}^{N-1} \sum_k y''_{(n,t,k)}(N, \tau) \alpha_n = \quad \text{(Equation 39b)}$$

$$\sum_{m,n} \alpha_m \alpha_n \sum_{k,\ell} u''_{(n,t,k)(m,\tau,\ell)}(N) + \text{noise}_2$$

Consequently, a squared-error function of the form $$J_{cal}(\alpha_1, \alpha_2, \cdots, \alpha_{N-1}) = \sum_{(t,\tau): 1 \le t < \tau \le T} \varepsilon(t, \tau; N) \quad \text{(Equation 40)}$$

can be considered, where $$e(t, \tau) = \left| \sum_{m=1}^{N-1} \sum_\ell y''_{(m,\tau,\ell)}(N, t) \alpha_m - \sum_{n=1}^{N-1} \sum_k y''_{(n,t,k)}(N, \tau) \alpha_n \right|^2 \quad \text{(Equation 41)}$$

Defining the (N−1)-dimensional vector as $$a = [\alpha_1 \alpha_2 \ldots \alpha_{N-1}]^T \quad \text{(Equation 42)}$$

and comparing Equation 7 and Equation 41 reveals that the vector a can be obtained by the same (disclosed method) used to obtain the vector d in Equation 8. Note also that the conditions on M and T, ensuring calibration of the M-dimensional vector d in Equation 8 also apply on the hierarchical calibration of the vector a, with M replaces by N−1 (corresponding to the number of calibrated patches.

For example, consider the case T=9. A single 6×6 patch can be calibrated on each tone for n=1, 2, ..., N−1. Since $M_{max}(9)=37$, Note that N−1≤37 patches (each patch comprising 6×6 reference antennas) can be jointly hierarchically calibrated on tone N. As an example, a patch of as many as 36×36 reference antennas can be calibrated via T=9 OFDM symbols of N=37 tones each. 36 tones are used to calibrate (as many as) 36 distinct 6×6 patches, while the last tone calibrates all these patches together via hierarchical calibration.

Moreover using the disclosed signaling together with the proposed calibration methods based on error terms of the form of Equation 41 provides far superior calibration accuracy as the proposed signaling exploits a form of macro-diversity. Specifically, note that for each t, the antennas signaling on OFDM symbol t and tone N are dispersed throughout the large patch. Also, by construction of the signaling scheme, for each t and τ there are lots of antenna pairs (n,t,k)/(m,τ, $\ell$) in the vicinity of one another providing high-SNR observations, in the sense that there are enough significant-magnitude terms in the sum in the RHS of Equation 39a/Equation 39b to make the signal terms (sum) significantly larger than the noise terms.

Finally, note that given that wireless signals encounter distance-dependent attenuation (pathloss), a tone used to calibrate a 6×6 patch can be reused for calibration of another 6×6 patch sufficiently far away. As a result, it is possible that even a tone-reuse distance of 9 (in terms of "6×6 patches") may suffice to calibrate a field of 9×9 patches individually. As an example, a patch of as many as 36×36 reference antennas can be calibrated via T=9 OFDM symbols of N=10 tones each. 9 tones are needed to calibrate (as many as) 36 distinct 6×6 patches (with reuse 9), while the last tone calibrates all these patches together via hierarchical calibration. Similar tone reuse for hierarchical calibration can also be exploited to calibrate several larger patches in parallel. Due to the size of the patches reuse 4 would suffice for this purpose. However, even with this technique the patches have edges. In one embodiment, the edges can be eliminated by performing four hierarchical calibrations on four overlapping tessellations. This is shown in FIG. 12. Four sets of four tones are required: one for the solid tessellation, one for the dashed, one for the dash-dot and one for the dotted tessellation. Hence, a total T=9 OFDM symbols each comprising N=9+4×4=25 tones suffice to calibrate the whole field for CoMP transmission. In particular, any set of closely located base stations can establish calibrated CoMP transmission by relying on the calibration coefficients arising from (at least) one of the 4 hierarchical calibration sets, since such a set of closely located base stations would be included in at least one (solid, dotted, dashed, or dash-dot) 36×36 patch of antennas.

Finally, note that although the preceding disclosure is described on a regular square grid layout, the use of such a layout is only for clarity. In principle, this can be applied by splitting the area in patches of 36 (or fewer) antenna elements (not necessarily on any grid) and proceeding accordingly. Also extra OFDM symbols and/or tones can be included to provide additional robustness.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for relative calibration of multiple transceiver units for their use for joint transmission from groups of transceiver units to at least one other wireless entity, wherein each transceiver unit includes an antenna element, the method comprising:
   exchanging pilots using multiple signaling resource slots, using at least two non- overlapping groups of transceiver units, including
      a first group of transceiver units simultaneously broadcasting a first pilot in a first slot and each transceiver in a group of transceiver units that includes transceiver units in a second group of transceiver units receiving a first observation, and
      the second group of transceiver units simultaneously broadcasting a second pilot in a second slot and each transceiver in a group that includes the transceiver units in the first group of transceiver units receiving a second observation; and
   performing calibration of transceiver units in the first and second groups of transceiver units, including choosing relative calibration parameters to control calibration and using a metric to assess calibration, the metric being based on at least one combination of calibration parameters and the observations of each transceiver group in at least two groups of transceiver units based on the simultaneous pilot broadcast and subsequent reception between transceiver units in pairs of groups of transceiver units.

2. The method defined in claim 1 wherein the calibration parameters comprise a set of calibration coefficients, and where the relative calibration coefficient of an individual transceiver unit is defined as a ratio of transmitter gain of the individual transceiver unit over receiver gain of the individual unit.

3. The method defined in claim 1 further comprising combining the calibration parameters and the observations in the at least two groups to form an error indication from the first and second groups of transceivers.

4. The method defined in claim 3 where the metric comprises a combination of the error indications from all possible pairs of transceiver groups.

5. The method defined in claim 4 wherein the combination of the error indications comprises a sum of the error indications.

6. The method defined in claim 1 further comprising partitioning a collection of the transceiver units into groups of equal size or groups that differ in size by at most one transmitter unit, and assigning each group at least one slot for simultaneous pilot broadcast.

7. The method defined in claim 1 wherein performing calibration is to enable transmission by transceiver units in the first and second group of transceiver via channel-reciprocity based training.

8. The method defined in claim 1 wherein performing calibration comprises performing a least-squares calibration method.

9. The method defined in claim 8 wherein performing calibration comprises obtaining a least-squares-based unit-norm estimate for use in an update.

10. The method defined in claim 9 wherein obtaining the least-squares-based unit-norm estimate comprises:
   updating a matrix R from slot to slot, including incrementally updating an intermediate matrix of scalar coefficients containing amplitude and phase shifts introduced by radio-frequency (RF)-to-baseband conversion hardware; and
   performing eigen-decomposition to obtain the least-squares-based unit-norm estimate.

11. A wireless communication system comprising:
   a plurality of base stations comprising a first base station and a second base station, wherein the first and second base stations broadcast information indicative of their load; and
   a plurality of user terminals comprising a first user terminal,
   wherein the plurality of base stations is operable to exchange pilots using multiple signaling resource slots, using at least two non-overlapping groups of transceiver units, by, at least in part, having
      a first group of transceiver units simultaneously broadcast a first pilot in a first slot and each transceiver in a group of transceiver units that includes transceiver units in a second group of transceiver units receive a first observation, and
      the second group of transceiver units simultaneously broadcast a second pilot in a second slot and each transceiver in a group that includes the transceiver units in the first group of transceiver units receive a second observation; and
   further wherein transceiver units in the first and second groups of transceiver units are calibrated by choosing relative calibration parameters to control calibration and using a metric to assess calibration, the metric being based on at least one combination of calibration parameters and the observations of each transceiver group in at least two groups of transceiver units based on the simultaneous pilot broadcast and subsequent reception between transceiver units in pairs of groups of transceiver units.

12. The wireless communication system defined in claim 11 wherein the calibration parameters comprise a set of calibration coefficients, and where the relative calibration coefficient of an individual transceiver unit is defined as a ratio of transmitter gain of the individual transceiver unit over receiver gain of the individual unit.

13. The wireless communication system defined in claim 11 wherein the calibration parameters and the observations are linearly combined in the at least two groups to form an error indication from the first and second groups of transceivers.

14. The wireless communication system defined in claim 3 where the metric comprises a combination of the error indications from all possible pairs of transceiver groups.

15. The wireless communication system defined in claim 14 wherein the combination of the error indications comprises a sum of the error indications.

16. The wireless communication system defined in claim 11 wherein the transceiver units of the plurality of base stations are partitioned into groups of equal size or groups that differ in size by at most one transmitter unit, with each group being assigned at least one slot for simultaneous pilot broadcast.

17. The wireless communication system defined in claim 11 wherein transceiver units of the plurality of base stations are calibrated to enable transmission by transceiver units in the first and second group of transceiver via channel-reciprocity based training.

18. The wireless communication system defined in claim 11 wherein transceiver units of the plurality of base stations are calibrated by performing a least-squares calibration method.

19. The wireless communication system defined in claim 18 wherein least-squares calibration method obtains a least-squares-based unit-norm estimate.

20. The wireless communication system defined in claim 19 wherein the least-squares-based unit-norm estimate is obtained by, at least in part, updating a calibration matrix R from slot to slot, including incrementally updating an intermediate matrix of scalar coefficients containing amplitude and phase shifts introduced by radio-frequency (RF)-to-baseband conversion hardware; and performing eigen-decomposition to obtain the least-squares-based unit-norm estimate.

21. An article of manufacture having one or more computer readable storage media storing executable instructions thereon which when executed cause a controller to perform a method for relative calibration of multiple transceiver units for their use for joint transmission from groups of transceiver units to at least one other wireless entity, wherein each transceiver unit includes an antenna element, the method comprising:
    exchanging pilots using multiple signaling resource slots, using at least two non-overlapping groups of transceiver units, including
        a first group of transceiver units simultaneously broadcasting a first pilot in a first slot and each transceiver in a group of transceiver units that includes transceiver units in a second group of transceiver units receiving a first observation, and
        the second group of transceiver units simultaneously broadcasting a second pilot in a second slot and each transceiver in a group that includes the transceiver units in the first group of transceiver units receiving a second observation; and
    performing calibration of transceiver units in the first and second groups of transceiver units, including choosing relative calibration parameters to control calibration and using a metric to assess calibration, the metric being based on at least one combination of calibration parameters and the observations of each transceiver group in at least two groups of transceiver units based on the simultaneous pilot broadcast and subsequent reception between transceiver units in pairs of groups of transceiver units.

22. The article of manufacture defined in claim 21 wherein the calibration parameters comprise a set of calibration coefficients, and where the relative calibration coefficient of an individual transceiver unit is defined as a ratio of transmitter gain of the individual transceiver unit over receiver gain of the individual unit.

23. The article of manufacture defined in claim 21 wherein the method further comprises combining linearly the calibration parameters and the observations in the at least two groups to form an error indication from the first and second groups of transceivers.

24. The article of manufacture defined in claim 23 where the metric comprises a combination of the error indications from all possible pairs of transceiver groups.

25. The article of manufacture defined in claim 24 wherein the combination of the error indications comprises a sum of the error indications.

* * * * *